Feb. 9, 1954 O. W. SWANSON 2,668,659

TOTAL PRINTING CONTROL MECHANISM
FOR TYPEWRITER-COMPUTERS

Original Filed March 5, 1947 15 Sheets-Sheet 1

INVENTOR
OSCAR W. SWANSON
BY Jesse A. Holton
ATTORNEY

Feb. 9, 1954 O. W. SWANSON 2,668,659

TOTAL PRINTING CONTROL MECHANISM
FOR TYPEWRITER-COMPUTERS

Original Filed March 5, 1947 15 Sheets-Sheet 2

INVENTOR
OSCAR W. SWANSON
BY Jesse A. Holton
ATTORNEY

Feb. 9, 1954 O. W. SWANSON 2,668,659

TOTAL PRINTING CONTROL MECHANISM
FOR TYPEWRITER-COMPUTERS

Original Filed March 5, 1947 15 Sheets-Sheet 3

INVENTOR
OSCAR W. SWANSON
BY Jesse A. Holton
ATTORNEY

Feb. 9, 1954 O. W. SWANSON 2,668,659

TOTAL PRINTING CONTROL MECHANISM FOR TYPEWRITER-COMPUTERS

Original Filed March 5, 1947 15 Sheets-Sheet 4

INVENTOR
OSCAR W. SWANSON
BY Jesse A. Holton
ATTORNEY

Feb. 9, 1954

O. W. SWANSON

TOTAL PRINTING CONTROL MECHANISM
FOR TYPEWRITER-COMPUTERS 2,668,659

Original Filed March 5, 1947

15 Sheets-Sheet 5

INVENTOR.
OSCAR W. SWANSON
BY Jesse A. Holton
ATTORNEY

Feb. 9, 1954 O. W. SWANSON 2,668,659

TOTAL PRINTING CONTROL MECHANISM FOR TYPEWRITER-COMPUTERS

Original Filed March 5, 1947 15 Sheets-Sheet 6

INVENTOR
OSCAR W. SWANSON
BY Jesse A. Holton
ATTORNEY

Feb. 9, 1954 O. W. SWANSON 2,668,659

TOTAL PRINTING CONTROL MECHANISM
FOR TYPEWRITER-COMPUTERS

Original Filed March 5, 1947 15 Sheets-Sheet 7

INVENTOR
OSCAR W. SWANSON
BY Jesse A. Holton
ATTORNEY

Feb. 9, 1954 O. W. SWANSON 2,668,659

TOTAL PRINTING CONTROL MECHANISM
FOR TYPEWRITER-COMPUTERS

Original Filed March 5, 1947 15 Sheets-Sheet 8

INVENTOR
OSCAR W. SWANSON
BY Jesse A. Holton
ATTORNEY

Feb. 9, 1954

O. W. SWANSON

TOTAL PRINTING CONTROL MECHANISM FOR TYPEWRITER-COMPUTERS 2,668,659

Original Filed March 5, 1947

15 Sheets-Sheet 9

INVENTOR
OSCAR W. SWANSON
BY Jesse A. Holton
ATTORNEY

INVENTOR
OSCAR W. SWANSON
BY Jesse A. Holton
ATTORNEY

Feb. 9, 1954 O. W. SWANSON 2,668,659

TOTAL PRINTING CONTROL MECHANISM FOR TYPEWRITER-COMPUTERS

Original Filed March 5, 1947 15 Sheets-Sheet 11

INVENTOR
OSCAR W. SWANSON
BY Jesse A. Holton
ATTORNEY

Feb. 9, 1954

O. W. SWANSON

TOTAL PRINTING CONTROL MECHANISM FOR TYPEWRITER-COMPUTERS 2,668,659

Original Filed March 5, 1947

15 Sheets-Sheet 12

INVENTOR
OSCAR W. SWANSON
BY Jesse A. Holton
ATTORNEY

Feb. 9, 1954 O. W. SWANSON 2,668,659

TOTAL PRINTING CONTROL MECHANISM
FOR TYPEWRITER-COMPUTERS

Original Filed March 5, 1947 15 Sheets-Sheet 13

INVENTOR
OSCAR W. SWANSON
BY Jesse A. Holton
ATTORNEY

Feb. 9, 1954 O. W. SWANSON 2,668,659

TOTAL PRINTING CONTROL MECHANISM
FOR TYPEWRITER-COMPUTERS

Original Filed March 5, 1947 15 Sheets-Sheet 14

INVENTOR
OSCAR W. SWANSON
BY Jesse A. Holton
ATTORNEY

INVENTOR
OSCAR W. SWANSON
BY Jesse A. Holton
ATTORNEY

Patented Feb. 9, 1954 2,668,659

UNITED STATES PATENT OFFICE 2,668,659

TOTAL PRINTING CONTROL MECHANISM FOR TYPEWRITER-COMPUTERS

Oscar W. Swanson, West Hartford, Conn., assignor to Underwood Corporation, New York, N. Y., a corporation of Delaware Continuation of application Serial No. 732,616, March 5, 1947. This application April 25, 1952, Serial No. 284,231

15 Claims. (Cl. 235—59)

Figures 1, 2A:
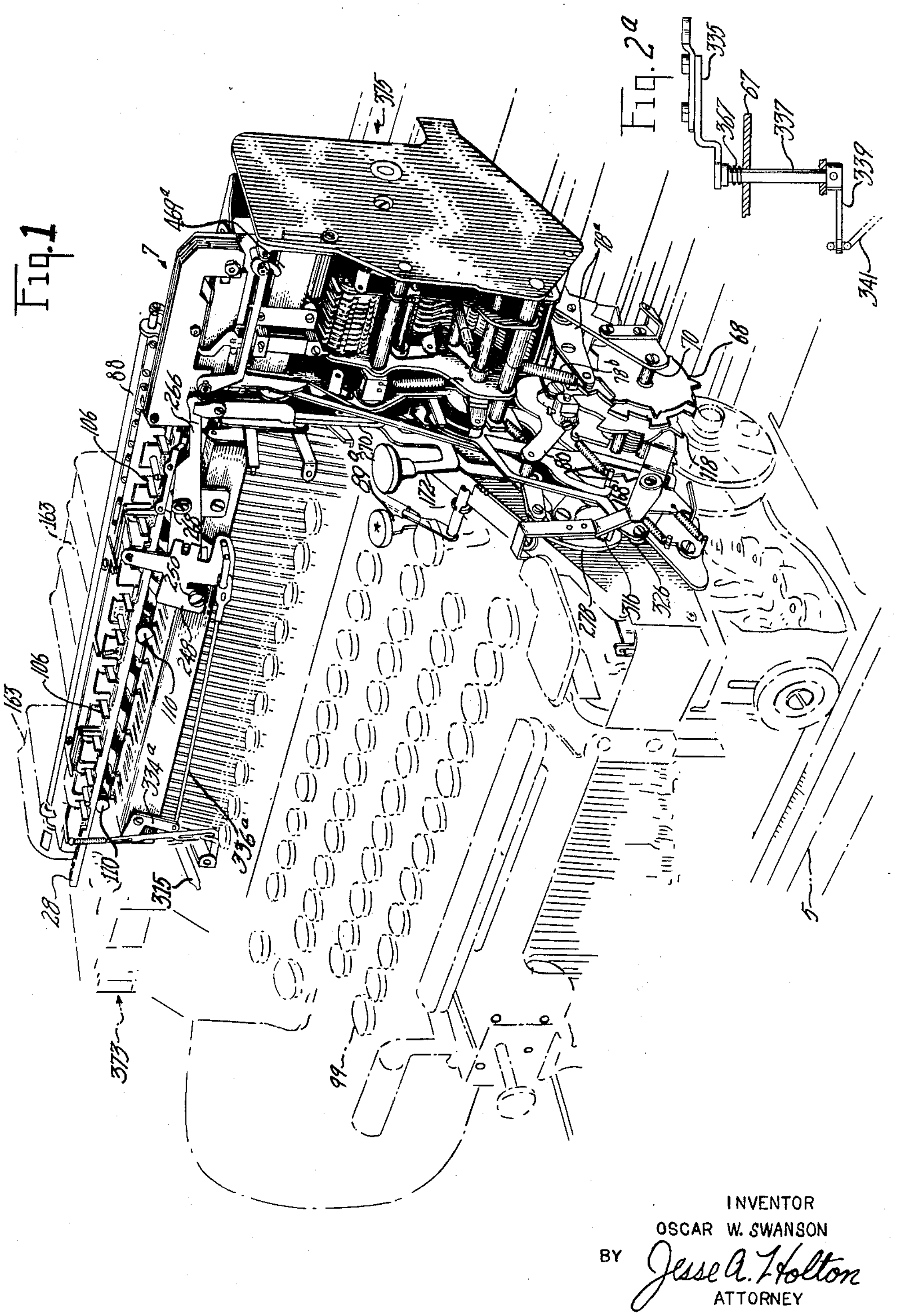

This invention relates to combined typewriting and accounting machines and more particularly to mechanism for automatically selecting the type-bar mechanisms and actuating the same by power to print a total entered in one of the registers of the machine.

Certain objects of the invention are to improve the construction and mode of operation of machines of the above type or class and to provide such machines with novel and improved type bar selecting and actuating mechanism for automatically selecting and actuating the type bars, to print the total set up in the register, digit by digit, which will eliminate the printing of any characters respectively corresponding with the characters in the total in the register to the left of the first significant figure and to the left of the decimal point position.

Another object of the present invention is to provide a combined typewriting and accounting machine having automatically actuated and controlled means for printing the total standing in a register with mechanism for eliminating the printing of any insignificant figures to the left of the decimal point position and for causing the printing of any insignificant figures to the right of the decimal point position or for printing some other character such as a star in place of the insignificant figures to the right of the decimal point position.

The present machine is constructed and arranged for the automatic printing of positive totals and also for the automatic printing of negative totals set up in the register. In the printing of positive totals, the type bar selecting and actuating mechanism is constructed and arranged to eliminate the printing of any characters respectively for the zeros in the denominations to the left of the first significant figure and to the left of the decimal point position. The type bar selecting and actuating mechanism also is constructed and arranged to print a character for each zero in the total to the left of the first significant figure and to the right of the decimal point position.

The present machine is also constructed for the printing of true negative totals. In the printing of such totals, as is well known to those skilled in the art, the complement of the number indicated upon the value wheels of the totalizer is printed. The type bar selecting and actuating mechanism of the present machine is constructed and arranged to eliminate the printing of characters respectively corresponding to the "9"s in the negative total in the register to the left of the first significant figure and to the left of the decimal point position. The type bar selecting and actuating mechanism also is constructed and arranged to print a character for each insignificant "9" in the total to the right of the decimal point position.

With the above and other objects in view the invention consists in a machanism embodying the novel and improved features, constructions and combinations of parts hereinafter described and particularly pointed out in the claims, the advantages of which will be readily understood and appreciated by those skilled in the art.

The various features of the invention will be clearly understood from the accompanying drawings illustrating a machine embodying the invention in its preferred form, and the following detailed description of the construction therein shown.

Figure 2:
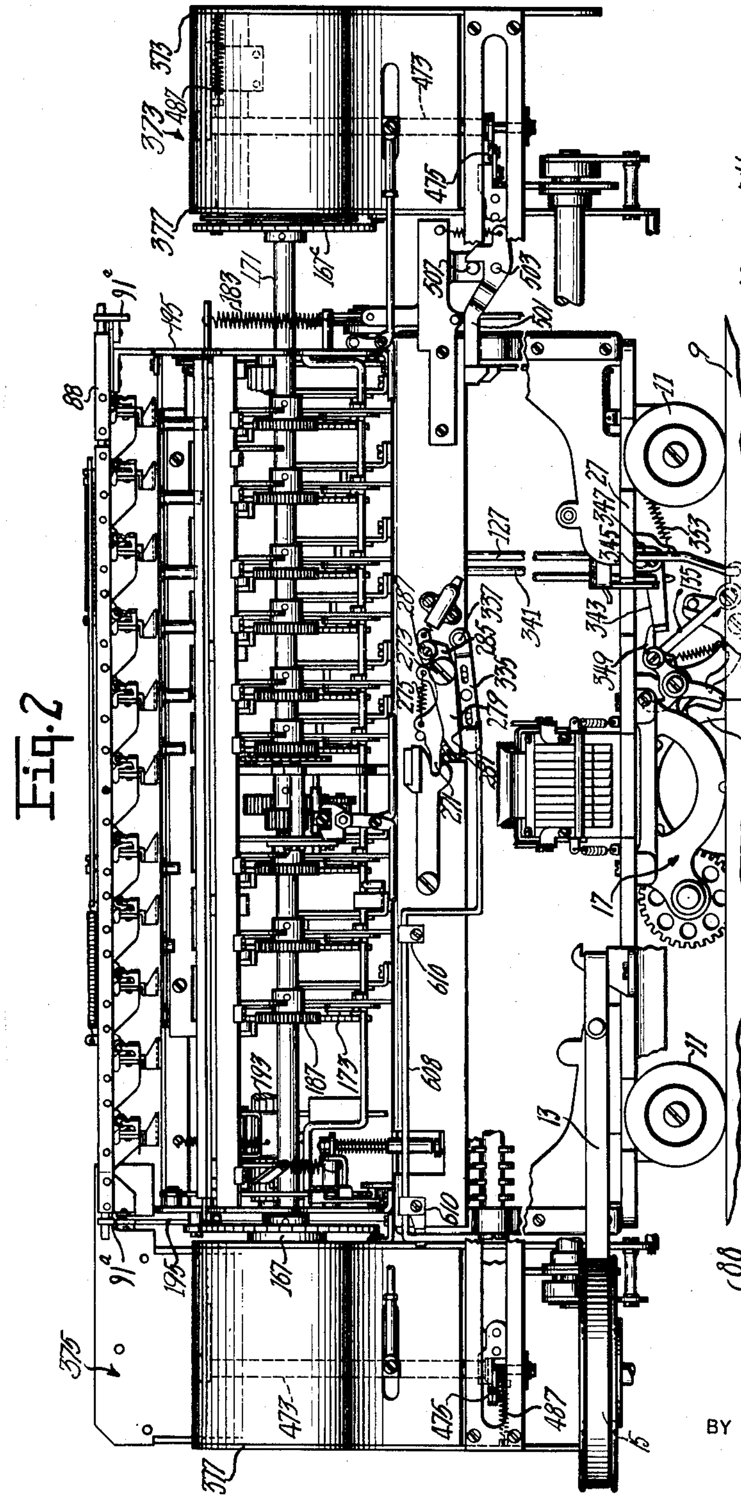
Figure 26:
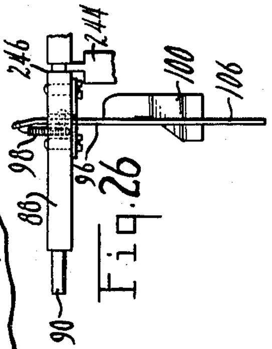
Figure 25:
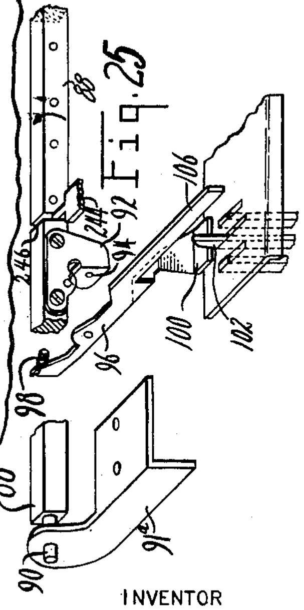
Figure 3:
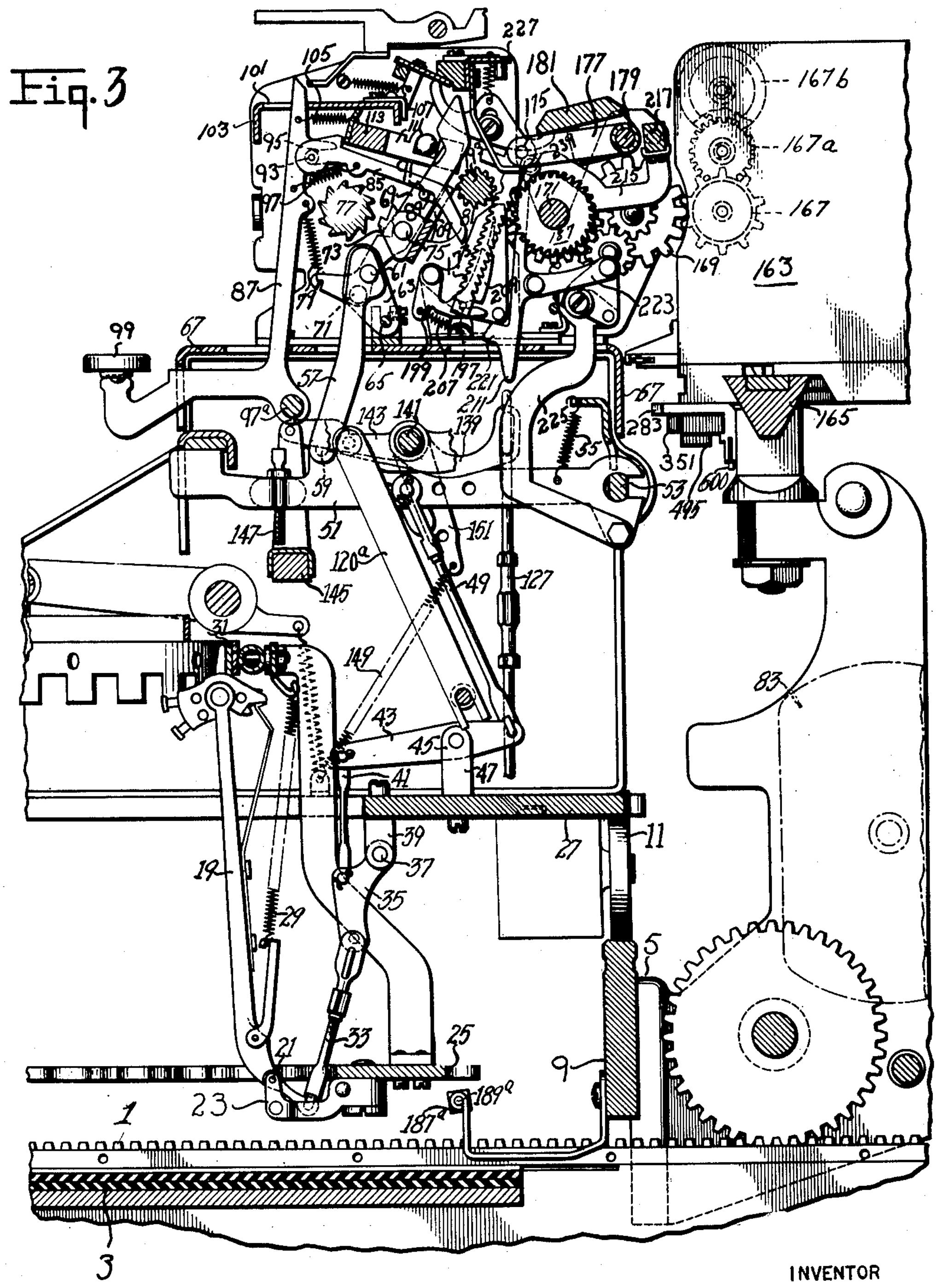
Figure 4:
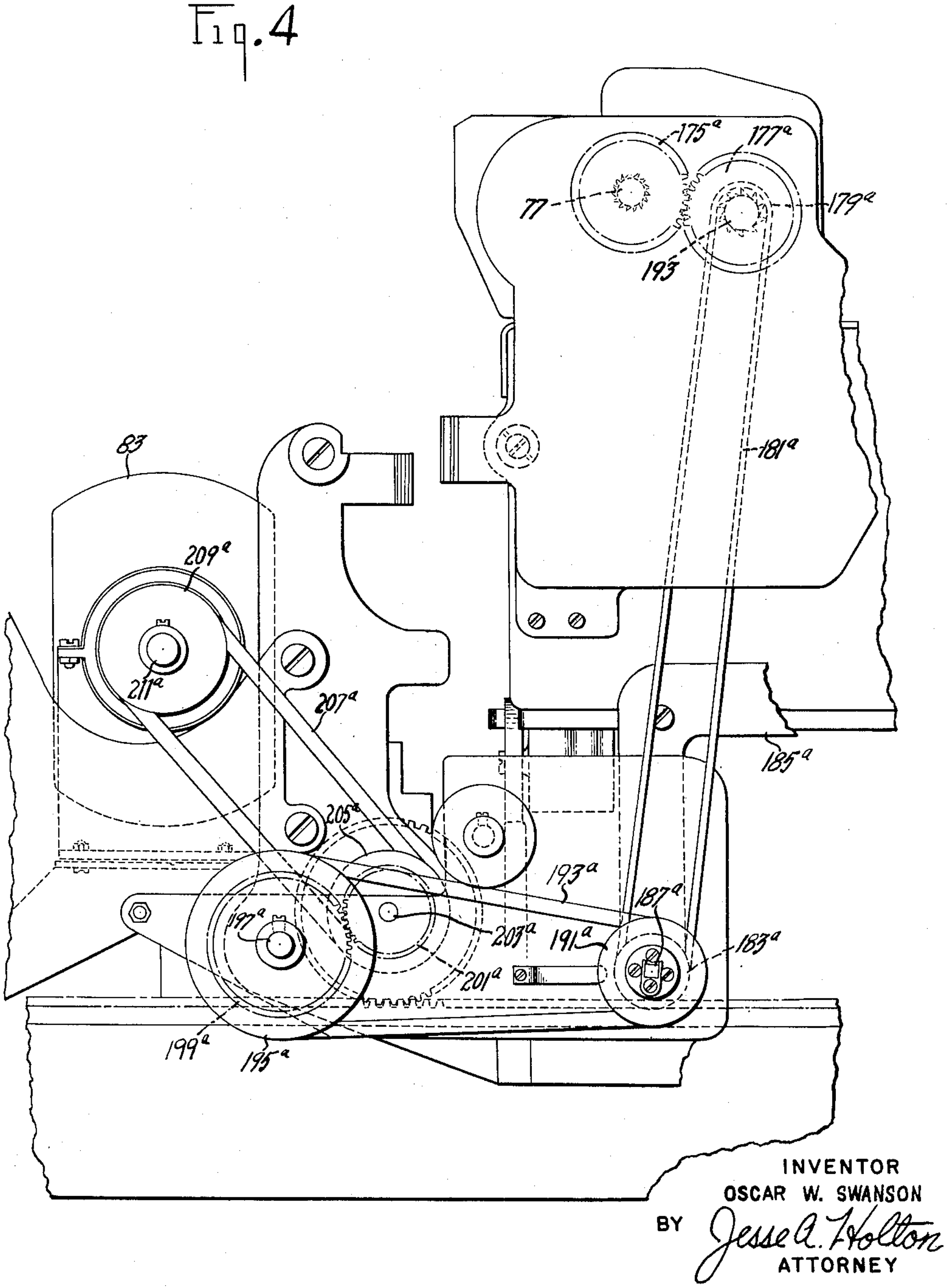
Figure 5:
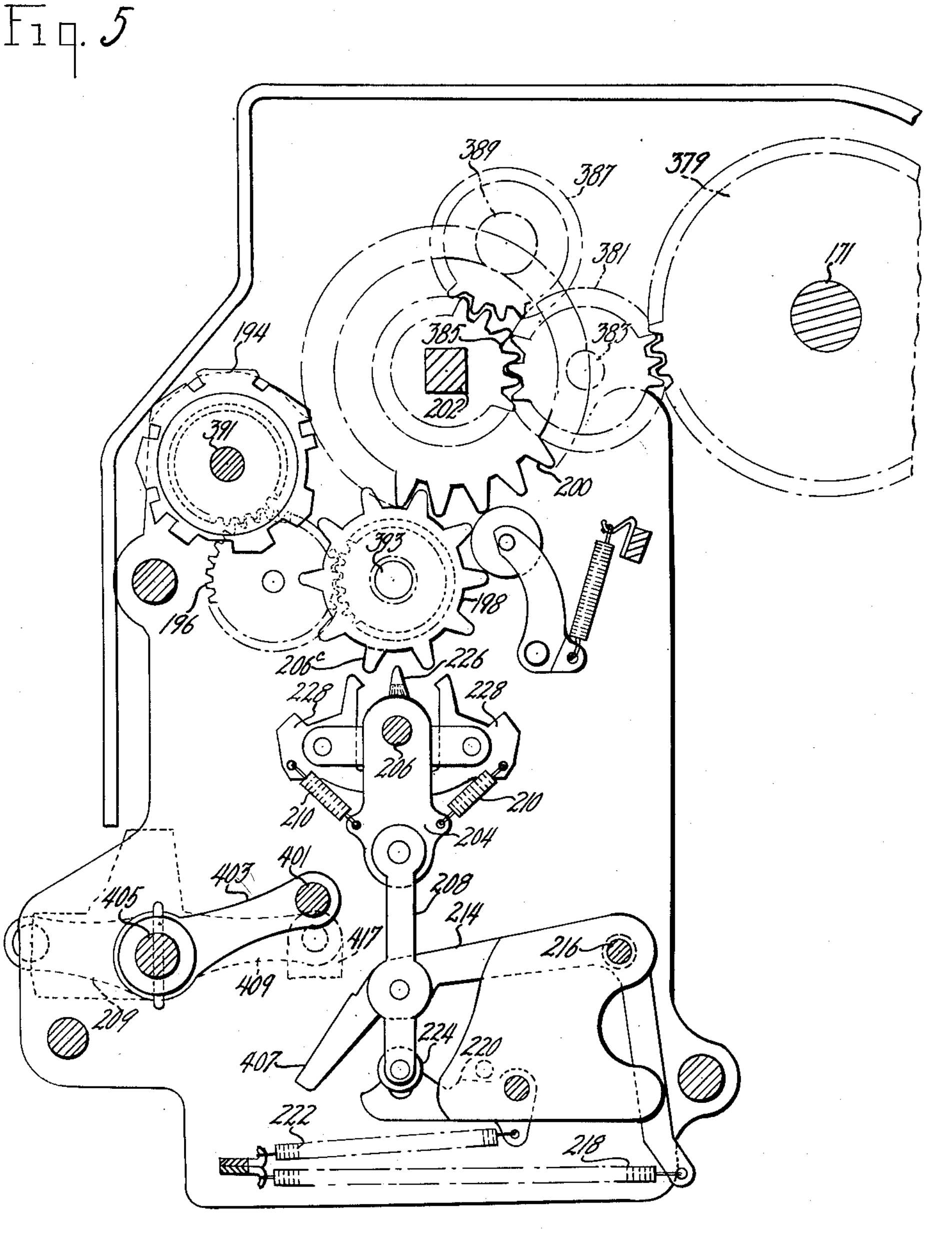
Figure 7:
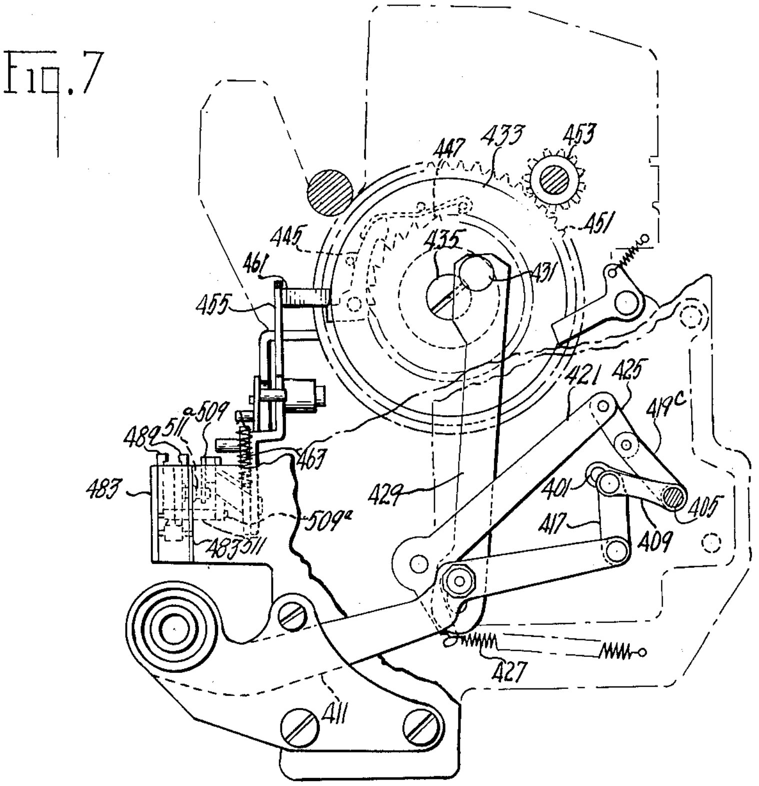
Figure 8:
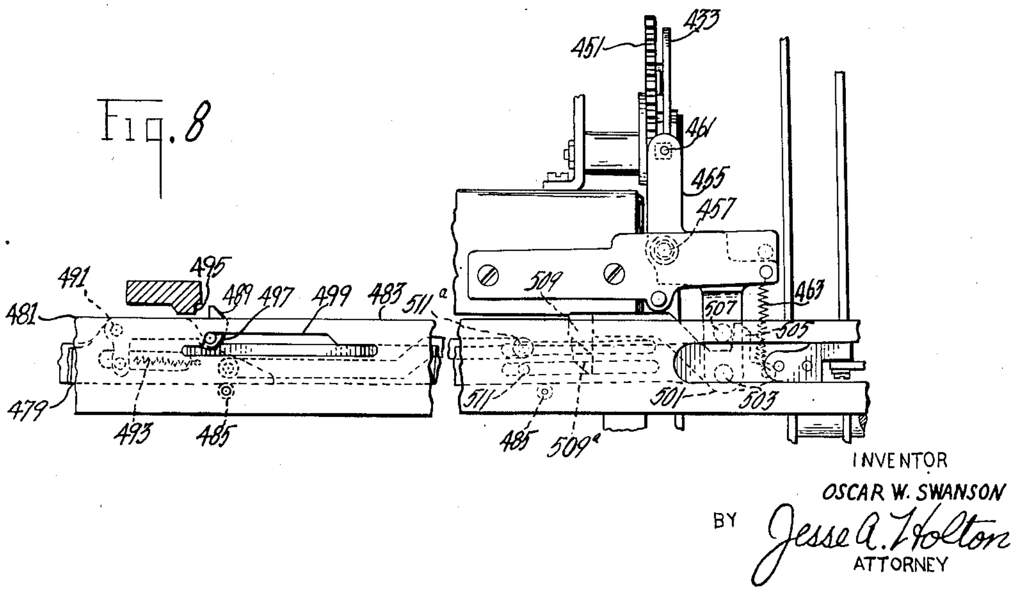
Figure 9:
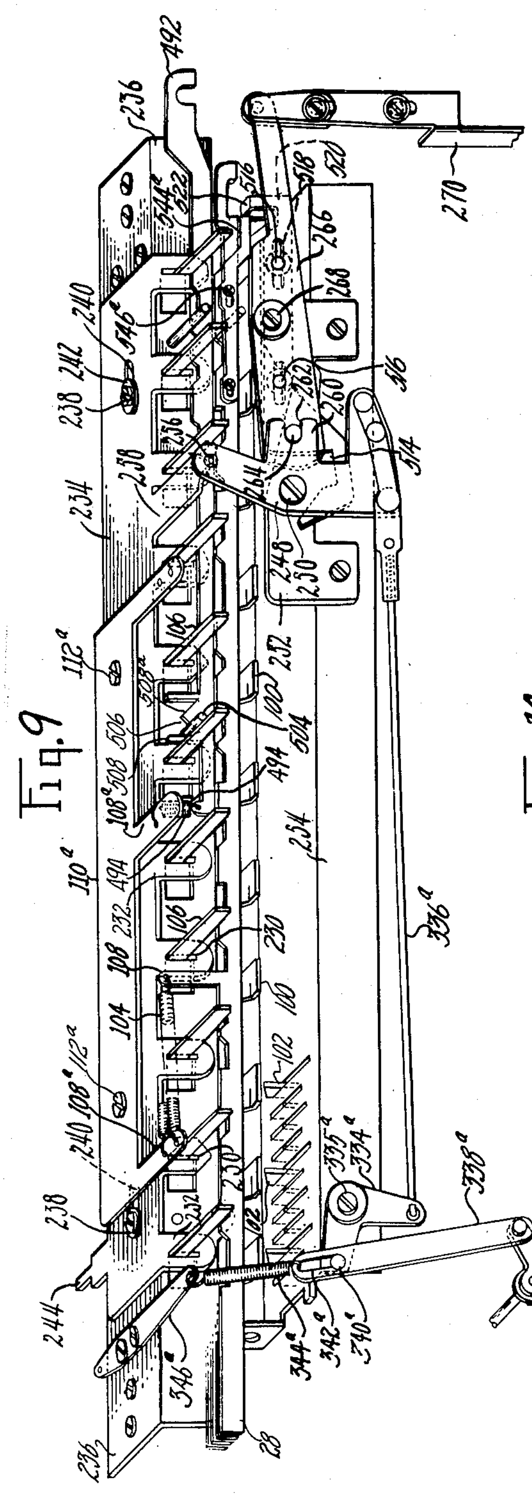
Figure 10:
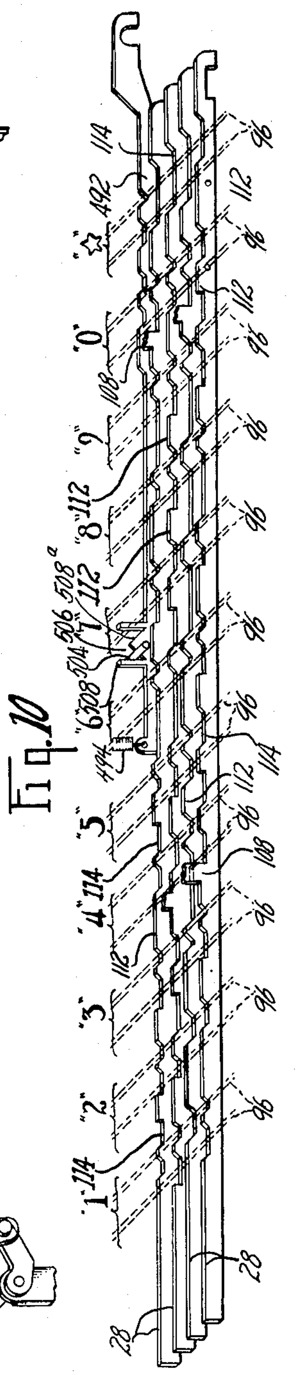
Figures 11, 12, 13, 14, 15:
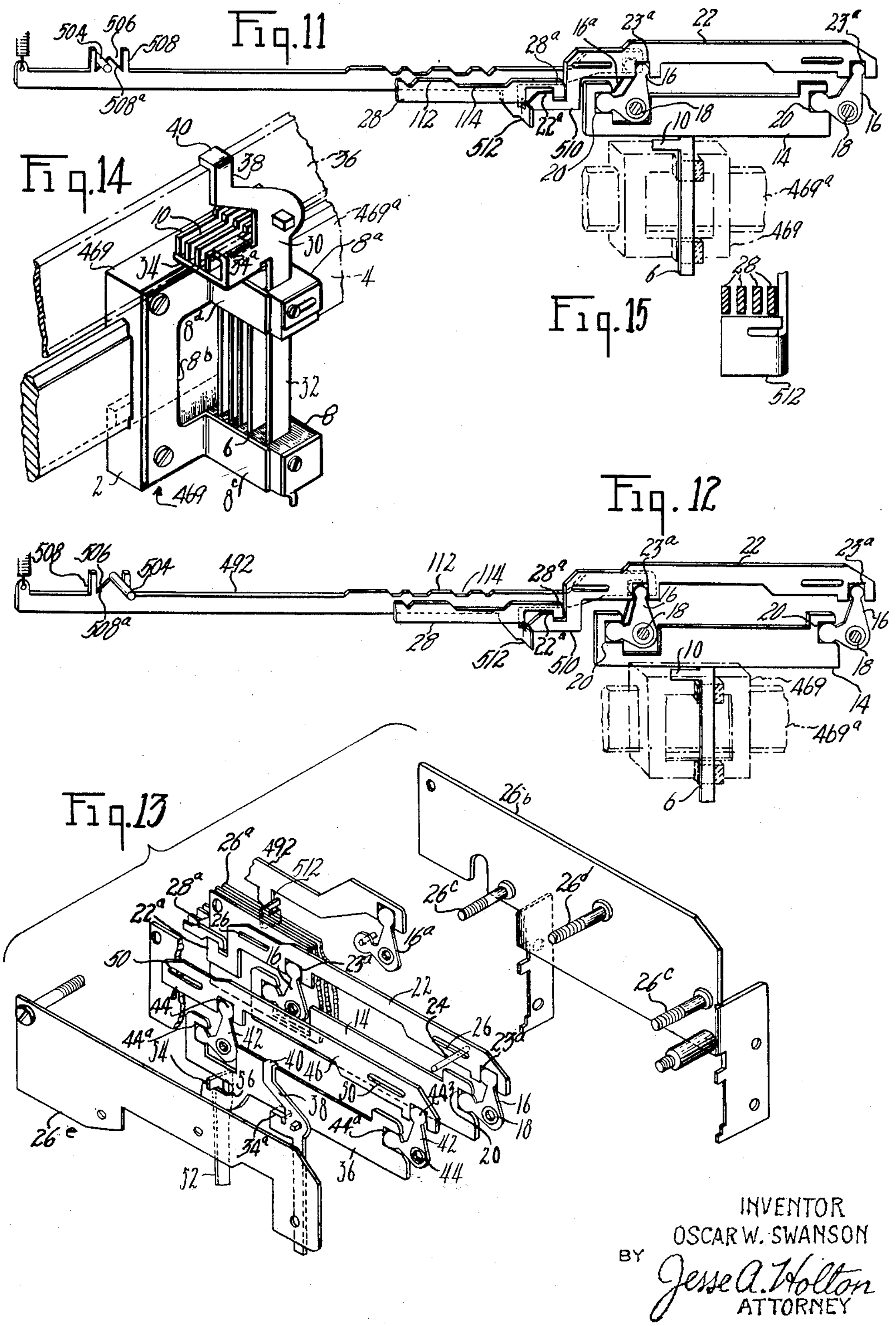
Figure 16:
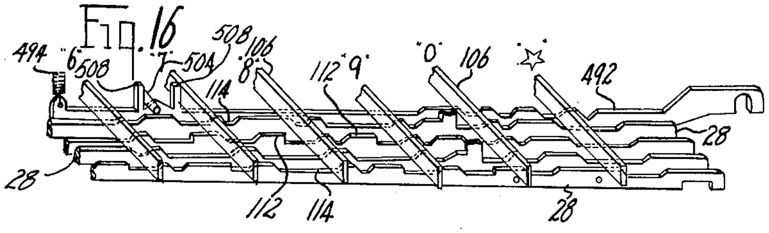
Figure 17:
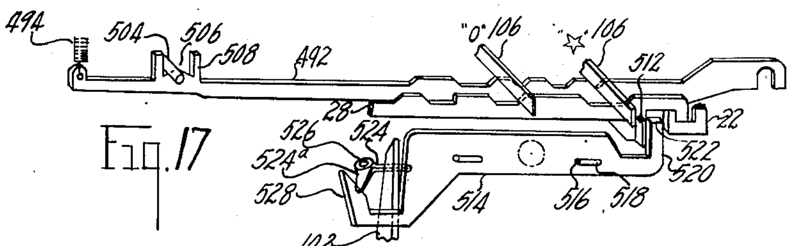
Figure 18:
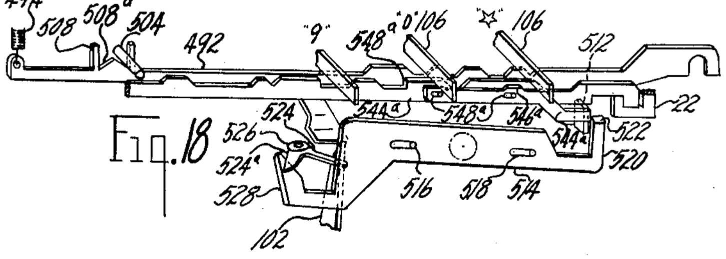
Figure 19:
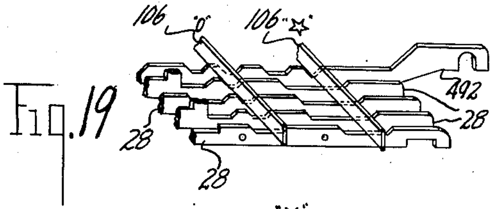
Figure 20:
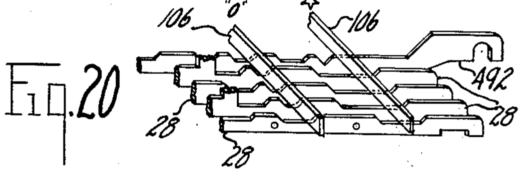
Figure 22:
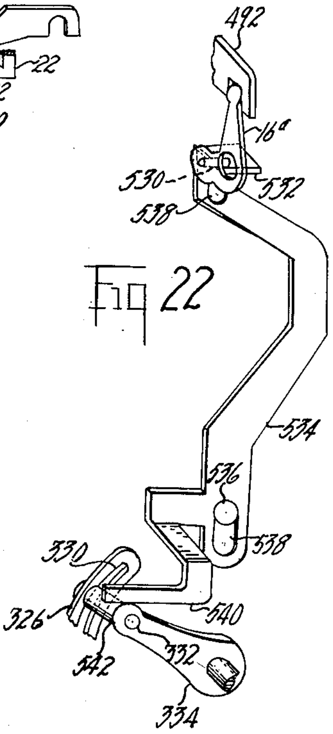
Figure 21:
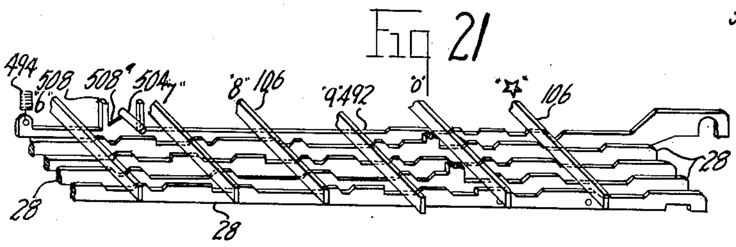
Figures 27, 28, 29:
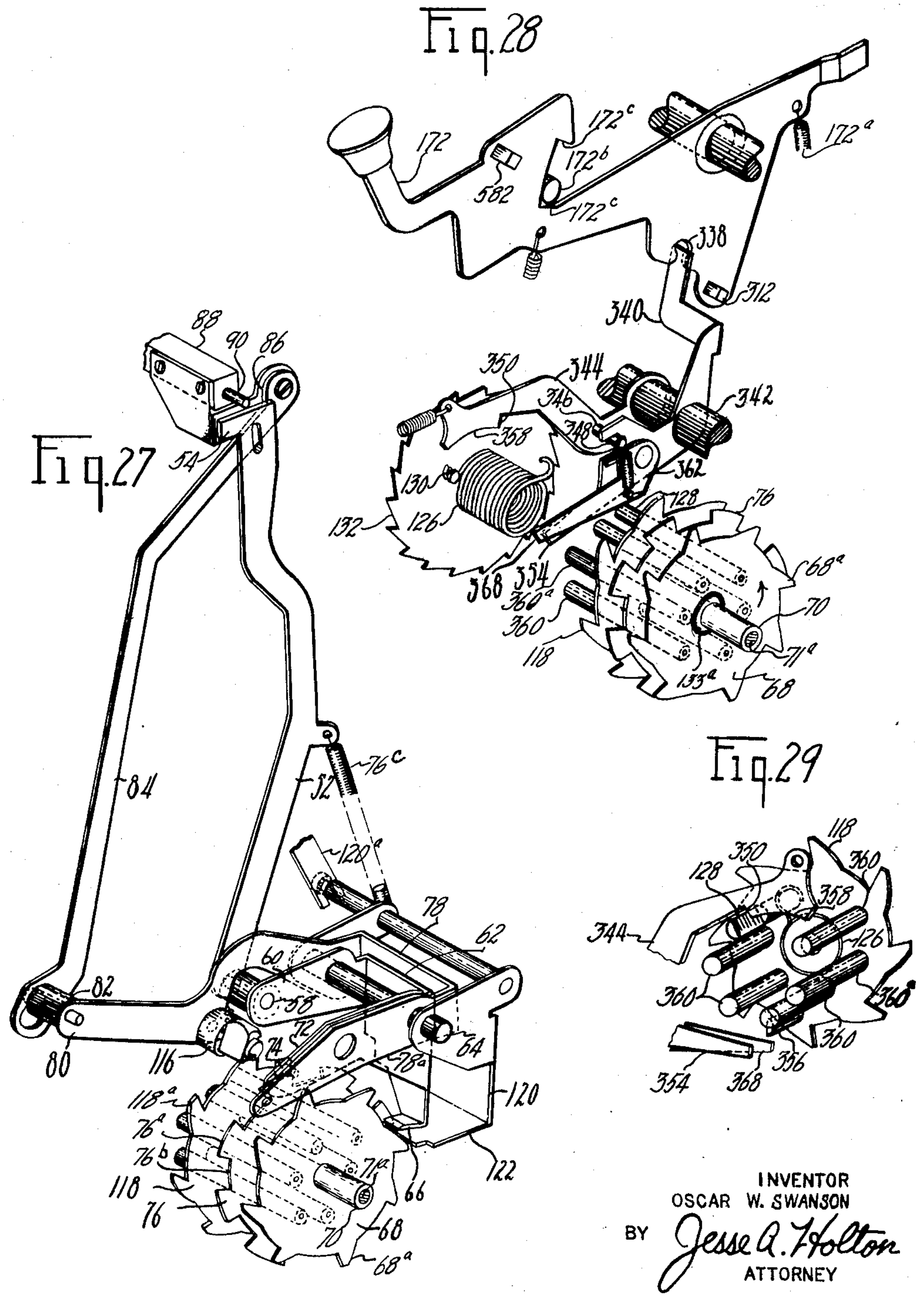
Figure 30:
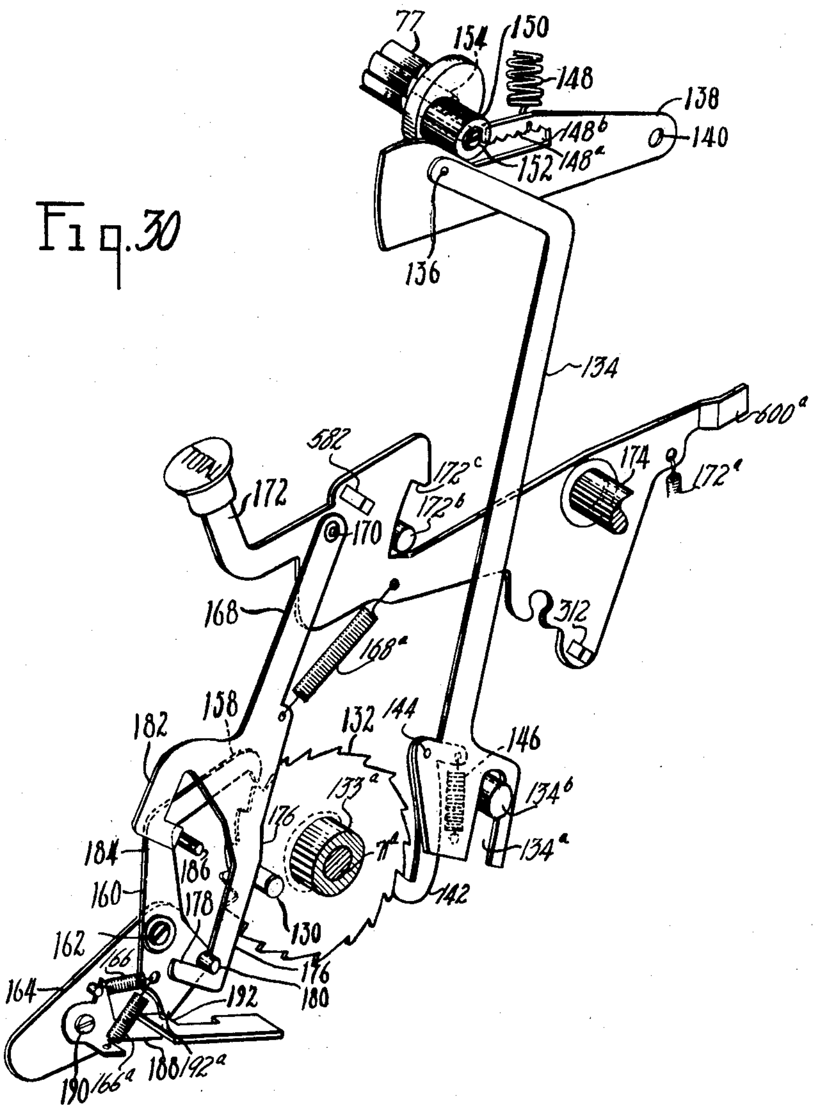
Figures 6, 23, 24, 31, 31A:
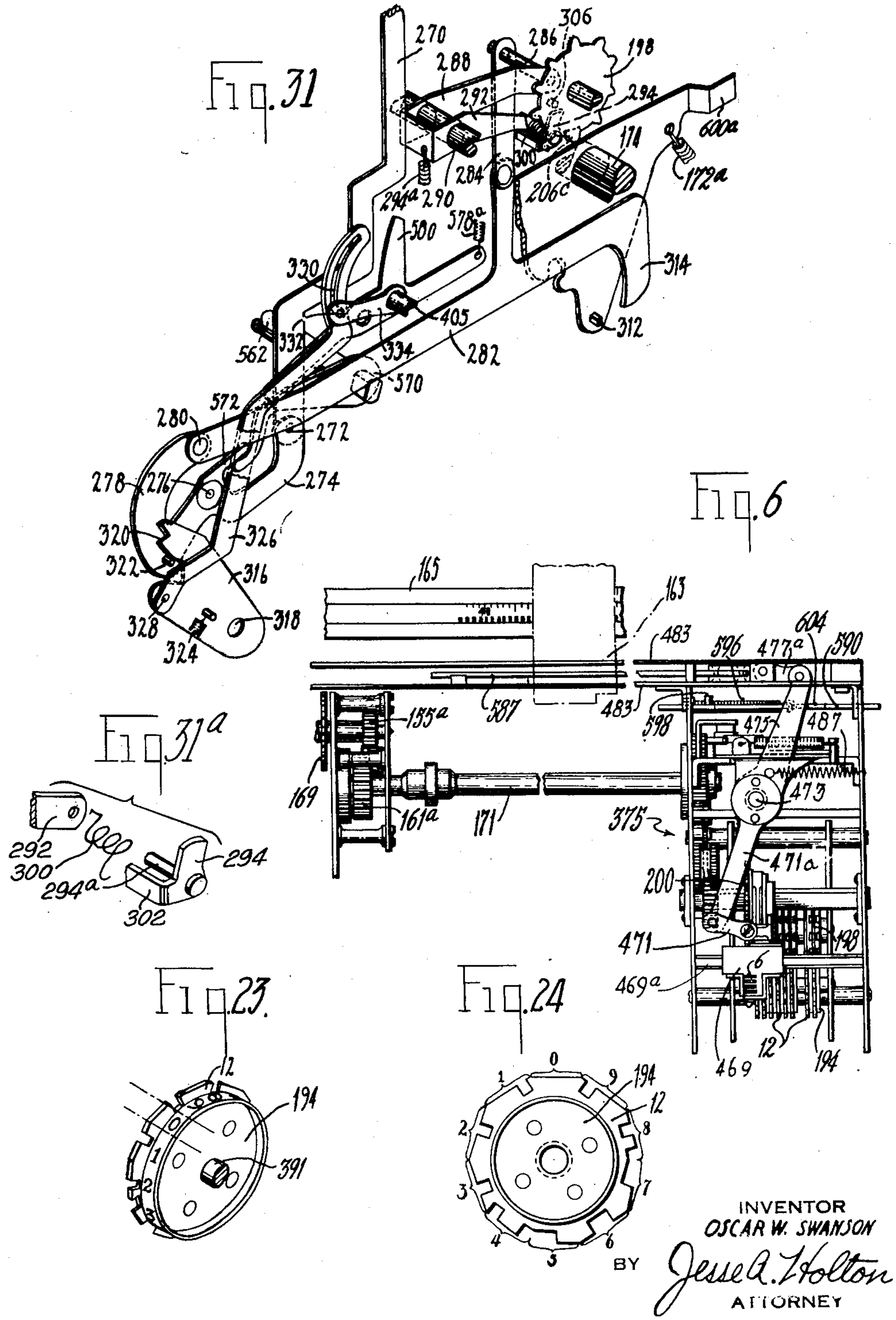

In the drawings:

Figure 1 is a perspective view of a machine embodying the invention, showing the mechanism more directly concerned with the invention in full lines, and the remainder of the machine in dot-and-dash lines, Figure 2 is a view in rear elevation illustrating particularly the type head or carriage of the machine, Figure 2*a* is a detail view, partly in plan and partly in horizontal section, illustrating certain parts of the mechanism shown in Figure 2, Figure 3 is a view in vertical section of the machine illustrating particularly the type bar and differential actuator mechanisms, Figure 4 is a view in side elevation illustrating the driving mechanism for the machine, Figure 5 is a view in side elevation illustrating the right-hand cross-computing register of the machine and certain associated parts, Figure 6 is a plan view of a portion of the machine illustrating particularly one of the cross-computing register mechanisms, Figure 7 is a detail view in side elevation illustrating particularly the transfer reset mechanism for one of the cross-computing registers, Figure 8 is a view in rear elevation showing certain parts of the mechanism illustrated in Figure 7 and certain associated parts, Figure 9 is a detail perspective view taken from the front of the type head and illustrating the mechanism for selectively controlling the actuation of the type bars from the total contained in one of the cross-computing registers and the mechanism for shifting certain of the parts, when the register moves from positive to negative condition and from negative to positive condition, Figure 10 is a detail perspective somewhat diagrammatic view illustrating certain longitudinally movable code bars for controlling the selective actuation of the type bars, detached from the machines, looking from the front thereof, Figure 11 is a detail perspective view illustrating certain of the parts shown in Figures 9 and 10 for selectively controlling the actuation of the type bars and an associated feeler mechanism, Figure 12 is a view similar to Figure 11 illustrating certain of the parts in different positions, Figure 13 is an exploded view in perspective illustrating certain parts of the feeler mechanism for selectively controlling the actuation of the type bars, Figure 14 is a detail perspective view illustrating particularly certain parts of said feeler mechanism, Figure 15 is a detail view partly in side elevation and partly in section illustrating the code bars for controlling the selection of the type-bar mechanism, Figure 16 is a perspective somewhat diagrammatic view illustrating a portion of each of the code bars for controlling the selection of the type bar mechanisms and portions of the cooperating selector levers for the numbers "5," "6," "7," "8," "9," and "0" and for star signal respectively, looking from the front thereof, Figure 17 is a detail perspective view illustrating two of the code bars for selecting the type bars, two of the selector levers and certain associated parts for controlling the printing of the star signals and zeros;

Figure 18 is a detail view similar to Figure 17 illustrating certain of the parts in different positions, Figure 19 is a detail perspective view similar to Figure 16, illustrating the several code bars and the selector levers for controlling the printing of zeros and star signals, Figure 20 is a view similar to Figure 19 illustrating certain of the parts in different positions, Figure 21 is a detail perspective view similar to Figure 16, illustrating the code bars and the selector levers corresponding to the numerals "6," "7," "8," "9," and "0" and the star signal lever, with certain parts in different positions from those in which they are shown in any of the other figures, Figure 22 is a detail perspective view illustrating the mechanism for restoring the rear code bar to normal position, Figure 23 is a detail perspective view illustrating one of the number wheels of the cross-computing register and an associated code-disk, Figure 24 is a view in side elevation illustrating the structure shown in Figure 23, Figure 25 is a detail exploded view in perspective, partly broken away, illustrating the selector levers and the mechanism for moving the same, Figure 26 is a detail plan view illustrating a portion of the mechanism shown in Figure 25, Figure 27 is a perspective view illustrating the cycle cams, the mechanism for controlling the movement of said cams, certain parts of the mechansm for actuating the selector levers and certain parts of the mechanism for actuating the feelers, Figure 28 is a perspective partially exploded view, illustrating the mechanism for rotating the cycle cams and for controlling the rotation thereof, Figure 29 is a detail perspective view illustrating a portion of the mechanism shown in Figure 28 with certain of the parts in different positions, Figure 30 is a perspective view illustrating the spring winding mechanism for winding the spring for rotating the cycle cams, Figure 31 is a detail perspective view illustrating the mechanism for shifting certain parts of the selector mechanism when the number wheel of highest denomination of the cross-computing mechanism is turned in a subtract direction from "0" to "9,"

Figures 32, 33, 34:
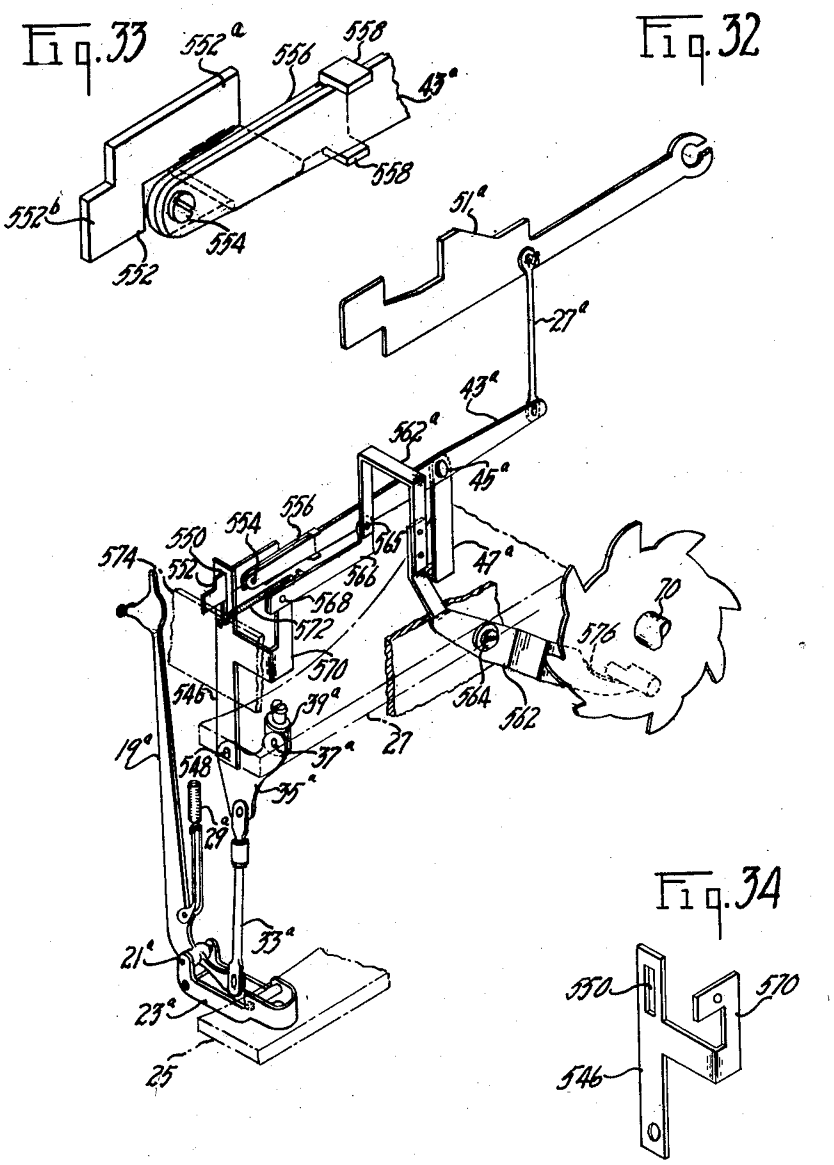
Figures 35, 37:
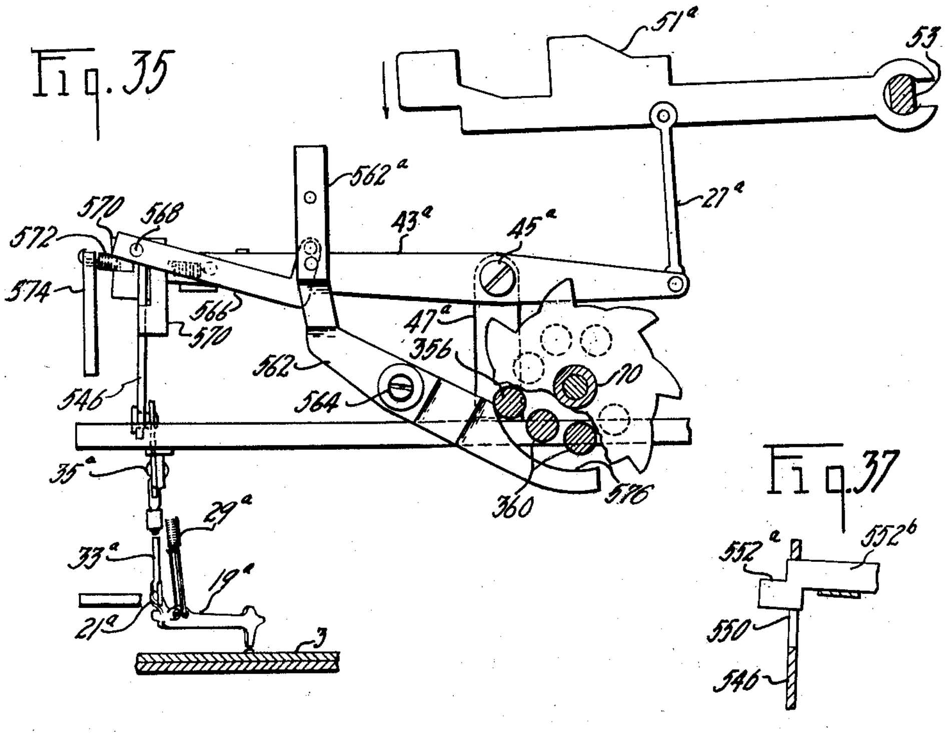
Figures 36, 38:
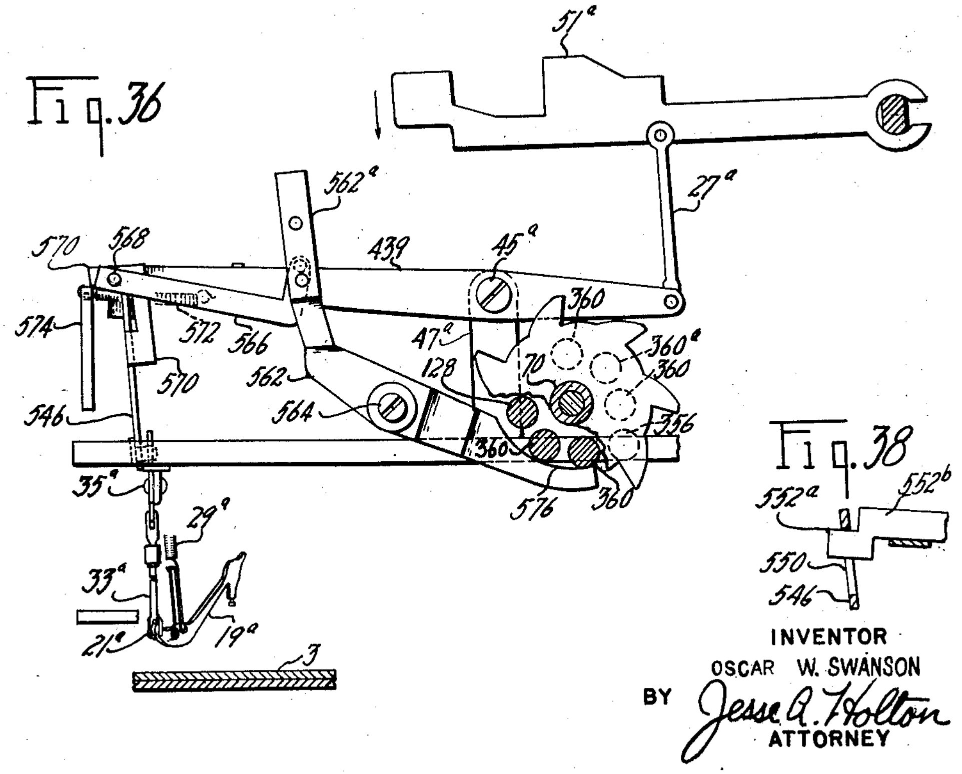
Figures 39, 40, 41, 42, 43, 44:
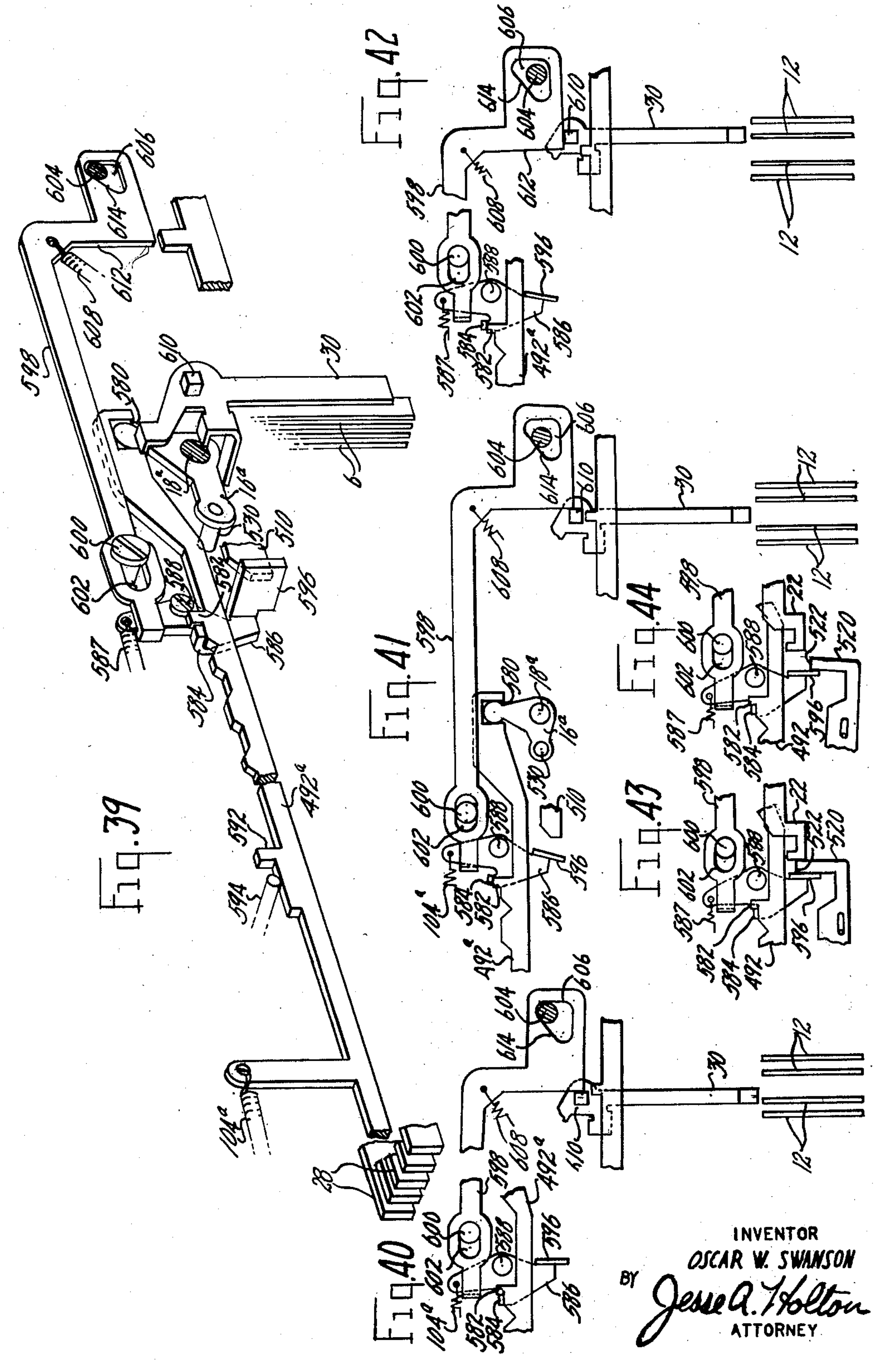

Figure 31*a* is a detail exploded view in perspective illustrating certain of the parts shown in Figure 31, Figure 32 is a detail perspective view illustrating the mechanism for eliminating the printing of a character for each figure in the total, in the crossfooter, in denominations to the left of the first significant figure and to the left of the decimal point position, and for causing the printing of a character for each figure in the total, in denominations to the left of the first significant figure and to the right of the decimal point position, Figure 33 is a detail perspective view illustrating a portion of the mechanism shown in Figure 32, Figure 34 is a detail perspective view illustrating one of the parts of the mechanism shown in Figure 32 detached from the machine, Figure 35 is a detail view in side elevation illustrating the mechanism shown in Figure 32 with certain of the parts in different positions, Figure 36 is a view similar to Figure 35 showing certain of the parts in still different positions, Figure 37 is a detail view in vertical section illustrating certain parts of the mechanism shown in Figures 32 to 36, inclusive, with said parts in the positions which they assume for the printing of a star signal, Figure 38 is a view similar to Figure 37 illustrating the parts in the positions which they assume to actuate partially the star signal type bar and avoid the printing of stars, Figure 39 is a detail perspective view illustrating mechanism for eliminating the printing of a character for each figure in the total in the crossfooter, in the denominations to the left of the first significant figure and to the left of the decimal point position, and for causing the printing of a figure respectively for each figure in the total to the left of the first significant figure and to the right of the decimal point position, with the parts in normal positions, Figure 40 is a detail view in front elevation illustrating a portion of the mechanism shown in Figure 39, with the parts in the position which they assume when the feeler carriage, feelers and master wheel are entering the decimal space position of the crossfooter, Figure 41 is a detail view in front elevation illustrating the greater part of the mechanism shown in Figure 39, with the parts in the positions which they assume when the feeler carriage, feelers and master wheel are located substantially in a central position with relation to the decimal space position of the crossfooter, Figure 42 is a detail view in front elevation illustrating a portion of the mechanism shown in Figure 39 with the parts in the position which they assume when the feeler carriage, feelers and master wheel are located in the tens of cents denomination of the crossfooter, Figure 43 is a detail view in front elevation illustrating a portion of the mechanism shown in Figures 39 to 42 inclusive and certain associated parts, and Figure 44 is a view in front elevation of the mechanism shown in Figure 43 with one of the parts in a different position.

This application is a continuation of my application Serial No. 732,616, filed March 5, 1947, and now abandoned.

The invention is illustrated and described in this application as applied to a combined typewriting and accounting machine of the Elliott-Fisher type, the typewriting and accounting mechanisms of which have substantially the same construction, arrangement, and mode of operation of parts as the corresponding mechanisms in the machine illustrated and described in the patent to Sundstrand No. 2,370,505, dated Feb. 27, 1945. As shown and described in said patent, the type-bar mechanisms and the differential actuating mechanisms are operated by power from a suitable motor.

In the illustrated construction, the machine comprises a platen frame, one of the side rails of which is indicated at 1, Figure 3, a substantially flat platen 3 mounted for vertical movement in said frame, a line-space frame, a portion of which is indicated at 5 mounted for forward and rearward movement on said platen frame and mechanisms for imparting a line-spacing movement to the line-space frame at the end of each return movement of the carriage, all as shown and described in said patent.

Upon the line-space frame is mounted a type carriage or head indicated as a whole at 7 upon which are mounted the usual series of type bars each carrying one or more types for engaging the work sheets supported on the platen (see Fig. 1). The type bars are arranged to be operated by power-driven mechanism in the present machine, and this mechanism, in part, is carried by the carriage. The carriage also carries the usual series of keys forming the keyboard of the machine and controlling the coaction of the type bars with the power-driven mechanism. The carriage also carries a master wheel by which the totalizers or registers are driven and mechanism for driving the master wheel differentially by power to set up or enter successively the various digits of a number step by step in a register.

The type carriage is mounted for movement forwardly and rearwardly with the line-space frame and is also mounted for lateral movement on said frame in a right-hand direction to letter space during a typing operation and for return movement in a left-hand direction to restore the carriage to position for starting the typing of a line (see Figs. 2 and 3). The carriage is provided with front and rear wheels or rollers arranged to engage, respectively, the front and rear rails of the line-space frame of which the rollers engaging the rear rail 9 are indicated at 11. The carriage is acted upon by the usual metallic band 13 having one end attached to the carriage and connected with the usual spring drum 15 which tends yieldingly to move the carriage constantly in a right-hand direction along the rails of the line-space frame, as shown in said Patent No. 2,370,505. The letter-spacing movement of the carriage is controlled by the usual escapement mechanism indicated as a whole at 17, this escapement mechanism having a construction such as that shown and described in said patent.

*Type action (see Fig. 3)*

The present machine is provided with a series of type bars 19 each pivoted at 21 to a hanger 23 secured to the semi-circular type-bar ring 25 suspended below the deck 27 of the carriage. The type bars are, respectively, acted upon by coil springs 29 which operate to retract the bars and tend to retain them in their normal positions with a projection formed on or carried by the type head in engagement with a semi-circular buffer ring 31.

The tail of each of the type bars is connected by a link 33 with an elbow lever 35 pivoted at 37 upon a hanger 39 depending from the deck 27. Each elbow lever is connected by a link 41 with the forward end of a sub-lever 43 pivoted at 45 upon a support 47 secured to the upper face of the deck 27. The rear end of the sub-lever 43 is connected by a link or push rod 49 with a horizontally arranged intermediate lever 51 pivoted on a fulcrum bar 53 extending across the rear of the type carriage. Each of the intermediate levers 51 is acted upon by a coil spring 55 which assists the retracting spring 29 in yieldingly holding the parts of the mechanism in the normal positions shown in Figure 3.

*Power driven type bar actuating mechanism*

In the present machine, power-driven mechanism is provided for swinging the intermediate levers 51 in a downward direction about the fulcrum bar 53 to actuate the type bars. This mechanism comprises a longitudinally movable transmitting link 57 pivotally connected to the intermediate lever 51 by means of a stud 59. The transmitting link is pivoted at 61 to a radius arm or lever 63 which is journaled on a rod 65 extending longitudinally of the type carriage and supported on the cover plate 67. Said mechanism also comprises a longitudinally movable driving link 69, the lower end of which is pivoted at 71 to the radius arm 63. A pawl 73 is pivoted at 75 to the driving link and is provided with two teeth arranged to engage the teeth of a continuously rotating toothed or fluted shaft 77 mounted in bearings on the type carriage. The lower end of the driving link is acted upon by a coil spring 79 which tends to swing the link is a clockwise direction about the pivot 71 and to maintain normally the link substantially in the position shown in Figure 3 with the pawl 73 in engagement with a fixed inclined arresting plate 81 extending across the type carriage, in which position the pawl is disengaged from the toothed shaft. In order to engage the pawl with the shaft, the driving link 69 is swung to the left (Fig. 3) about the pivot 71. The shaft 77 is continuously driven by power through suitable driving connections from a motor 83 as shown and described in said Patent No. 2,370,505. Upon the engagement of the pawl with the shaft, the driving link 69 is driven in a downward direction to actuate the transmitting link 57 and the intermediate lever 51 downwardly.

The driving links are swung to the left to engage the respective pawls carried thereby with the toothed shaft by mechanism actuated by the keys of the keyboard. This mechanism comprises a drag link 85 connected at its left-hand end (Fig. 3) with an upwardly extending arm of the key lever 87 and having a shoulder 89 adjacent its right-hand end arranged to engage a pin 91 mounted on the driving link 69. The left-hand end of the drag link is connected with the upwardly extending arm of the key lever 87 by means of a stud 93 mounted on the link and engaging in a slot 95 in said arm of the key lever and a coil spring 97 which normally holds the stud 93 seated in the left-hand end of the slot. Each of the key levers 87 is pivoted on a shaft 97*a* common to the keys of all the banks and is provided with a forwardly extending arm on which is fixed a key 99. The end of the upwardly extending arm of each of the key levers extends through a guide slot 101 formed in a guide plate 103 secured to the upper portion of the frame of the type carriage and the movement of the key lever is limited by the engagement of said arm with the ends of the guide slot. Each of the key levers is acted upon by a coil spring 105 which normally maintains the upwardly extending arm thereof in engagement with the rear end of the guide slot.

With this construction, upon the depression of the key 99 of the key lever, the upwardly extending arm thereof will be swung forwardly or to the left (Fig. 3) to engage the pawl 73 with the toothed shaft 77.

When the key is depressed to actuate the key lever to swing the driving link to the left to engage the pawl with the toothed shaft, the movement of the driving link is limited by the engagement of the pawl with said shaft. As the driving link is carried downwardly by the rotary movement of the shaft, the link is swung to the left, during the latter part of its movement, by the engagement of the pawl contacting tooth of the shaft with the upper tooth of the pawl, the movement of said tooth of the shaft then having a substantial component toward te left (Fig. 3). In order to limit this swinging movement of the driving link and cause the disengagement of the pawl from the tooth of the shaft at the desired time in the actuation of the type-bar mechanism, a series of stop plates 107 are adjustably mounted on the guide plate 103 and are arranged to be engaged respectively, by the upper ends of the driving links to limit the swinging movement thereof.

The free rear ends of the drag links 85 project through guide slots 109 formed in the upper portion of the arresting plate 81. The bottom walls of these slots limit the downward movement of the drag links under the influence of the springs 97 as the driving links move downwardly to actuate the type bars.

The trailing ends of the driving links 69 travel up and down and move forwardly and rearwardly in guide slots 111 formed in a transverse bar 113 supported on the frame of the type carriage.

*Escapement mechanism*

The present machine, as stated above, is provided with an escapement mechanism for controlling the letter-spacing movement of the type carriage having substantially the same construction, arrangement, and mode of operation of parts as the corresponding mechanism illustrated and described in the patent to Foothorap, No. 1,203,519. This escapement mechanism comprises a carriage feed rack 115, a feed pinion 117, an escapement wheel 121, escapement dogs 123 and 125, a link 135 and a spring 137 connecting said dogs, a universal bar 145 suspended upon arms 143 secured to rock shaft 141 and a draw wire 127 connecting an arm 139 secured to the rock shaft with an arm on the spacing dog 125. Each of the intermediate levers 51 of the respective type bar mechanisms carries an abutment screw 147 to engage the universal bar 145 and depress the same to actuate the rock shaft 141 as each intermediate lever is depressed to actuate a type bar mechanism. The rock shaft and the parts connected therewith are restored to normal position by a spring 149 attached to an arm 151 fixed to the rock shaft.

The escapement mechanism is controlled from the space bar by mechanism having substantially the same construction, arrangement and mode of operation of parts as the corresponding mechanism illustrated and described in the patent to Sundstrand No. 2,239,023.

*Register and differential actuator mechanisms (see Fig. 3)*

The machine illustrated is provided with a series of column registers 163 mounted at the rear of the machine upon a register bar 165 fixed to the line space frame, said registers being provided with totalizer wheels 167, 167*a* and 167*b*. The type carriage is provided with power-driven mechanism for actuating the totalizer wheels of the column registers to set up numbers in said wheels. This mechanism is controlled by the numeral keys of the typewriter keyboard. This mechanism comprises a master wheel 169 (Fig. 3) located at about the middle of the type carriage at the rear thereof and extending rearwardly from the carriage into position to engage the lowest set of wheels of the totalizer mechanism. The master wheel is fixed to a shaft journaled in the carriage and is connected by suitable gearing with the main differential actuator shaft 171 extending across the type carriage and journaled in suitable bearings 167*c* supported on the frame of the carriage, said connection being constructed and arranged so that the master wheel may be driven in opposite directions from the shaft 171 for addition and subtraction respectively in the register.

The shaft 171 is rotated differentially to impart differential movements to the master wheel 169 and to the totalizer wheels of a register to enter the desired numbers in the register by differential mechanisms selectively controlled from the several numeral keys of the type-bar mechanisms. These differential mechanisms are selectively thrown into operation by the corresponding numeral type-bar actuating mechanisms respectively. The said differential mechanisms have substantially the same construction, arrangement, and mode of operation as the corresponding mechanisms shown and described in the patent to Sundstrand, No. 2,370,505. The several mechanisms for differentially rotating the shaft 171 under control of the numeral keys from 3 to 9, inclusive, to enter corresponding numbers in the register, all have the same general construction, arrangement, and mode of operation of parts, these mechanisms differing only in the respects hereinafter pointed out to vary the rotative movement imparted to the shaft.

The mechanism for entering the numbers 3 to 9, inclusive, in the register (see Fig. 3) comprises a series of longitudinally movable rack bars 173, a corresponding series of supporting arms 177 respectively for said bars pivoted on shaft 179, the toothed or fluted shaft 193 arranged to be engaged with the teeth on the forward sides of the rack bars to move said bars upwardly, a spring depressed bail 181 for engaging all the arms 177 and tending constantly to force said arms and the rack bar downwardly, a spring 183 acting on said bail, a series of toothed wheels 187 fixed to the differential shaft 171 and arranged to be engaged respectively by the teeth on the rear sides of the corresponding rack bars during the downward movement of the respective bars to rotate the differential shaft to enter numbers in the register, a series of fixed cam plates 209 and a series of spring pressed detent levers 189 for engaging respectively the pins 197 fixed in the lower ends of the respective rack bars to hold the rack bars normally in position intermediate between the fluted shaft 193 and the toothed wheels 187.

Each rack bar 173 is normally held in the intermediate position shown in Figure 3. In entering a number into the register, the rack bar corresponding to the number is swung forwardly to engage the teeth on the forward side thereof with the fluted shaft 193 and the rack bar is then moved upwardly to the point required for its subsequent action at which it is disengaged from the shaft. The rack bar is then moved downwardly by the action of the bail 131. At a predetermined point in its downward movement, the rack bar is swung rearwardly to engage the teeth on the rear side thereof with the corresponding toothed wheel 187 and the bar is then moved downwardly to a constant position at which it is disengaged from said wheel. The mechanisms for differentially rotating the shaft 171 under control of the numeral keys 1 and 2 to enter corresponding numbers in the register differ in certain respects from the corresponding mechanisms for actuating the shaft to enter the numbers from 3 to 9 inclusive in the register. The differential mechanisms for entering the numbers 1 and 2 have substantially the same construction and mode of operation as the corresponding mechanisms illustrated and described in the patent to Sundstrand No. 2,370,505 referred to above.

The mechanism for swinging each rack bar forwardly into engagement with the fluted shaft is rendered operative only when the state control lever hereinafter referred to is set for computing and the master wheel 169 is located in the zone of a column register.

This mechanism comprises a lever 211, one for each rack bar, pivoted on an arm 215 secured to rock shaft 217, upon which arm said lever is suspended. When the master wheel is not located in the zone of a register and when the state control lever is set in "write" or "total" position and the master wheel is in the zone of a register, the rock shaft 217 is positioned so that the levers 211 are located in depressed positions with the projections 221 thereon placed below the pins 197 on the corresponding rack bars. When the state control lever is located in computing position and the type carriage is moved to place the master wheel in the zone of a register, the rock shaft 217 is turned in a direction to raise the levers 211 to place the projections 221 thereon respectively opposite the pins 197 on the corresponding rack bars.

The lever 211 is swung to the left to swing the corresponding type bar into engagement with the fluted shaft from the intermediate lever 51 of the corresponding type bar mechanism through a link 223 connecting the lever 221 with a plate fixed to the upper end of an arm 225 attached to said intermediate lever.

The mechanism for driving continuously the fluted shafts 77 and 193 (see Fig. 4) comprises a gear 175*a* fixed to the shaft 77 and a gear 177*a* fixed to the shaft 193 and meshing with the gear 175*a*. To the fluted shaft 193 is attached a pulley 179*a* connected by a belt 181*a* with a pulley 183*a* journaled on a hollow bearing secured to a bracket 185*a* attached to the frame of the carriage. This pulley is provided with a square opening in which fits a square shaft 187*a* having bearings at its ends on the line-space frame, one of which is indicated at 189*a* in Fig. 3, the pulley being slidable longitudinally of the shaft. Upon the shaft 187*a* is secured a pulley 191*a* connected by a belt 193*a* with a pulley 195*a* fixed to a shaft 197*a* mounted in bearings on the line-space frame. To the shaft 197*a* is attached a gear 199*a* meshing with a gear 201*a* journaled on a shaft 203*a* secured at its ends to the line-space frame. To the gear 201*a* is attached a pulley 205*a* connected by a belt 207*a* with a pulley 209*a* fixed to the shaft 211*a* of the motor 83.

The driving connections above described between the motor 83 and the fluted shaft 77 have substantially the same construction, arrangement and mode of operation as the driving connections between the motor and the corresponding fluted shaft shown and described in Sundstrand patent, No. 2,370,505, except that, in the present construction, there is no provision for driving the square shaft 187*a* at variable speeds from the shaft 197*a*. The sliding connection between the pulley 183*a* and the square shaft 187*a* maintains a driving connection between these parts while allowing the letter spacing and return movements of the carriage.

The mechanism for raising the levers 211 into operative position with relation to the pins 197 on the rack bars when the state control register is adjusted in compute position and the type carriage is located to place the master wheel 169 in the zone of a register has substantially the same construction, arrangement and mode of operation as the corresponding mechanism illustrated and described in the patent to Sundstrand, No. 2,370,505.

*Decimal space mechanism*

The decimal space mechanism of the machine is similar to the corresponding mechanism illustrated and described in Patent No. 1,512,282 referred to above, many of the parts having substantially the same construction, arrangement and mode of operation. This mechanism comprises a trip lever 335 (see Fig. 2) secured to the rear end of the longitudinally movable rock shaft 337 mounted in bearings on the frame of the type head, to the forward end of which shaft is attached an arm 339 pivotally connected to the upper end of a rod or wire 341. The lower end of this wire is pivotally connected to a lever 343 (see Fig. 2) pivoted at 345 upon a hanger 347 suspended from the deck 27, said lever being provided with a lateral projection which engages beneath the outwardly projecting arm 349 formed on the holding pawl of the escapement mechanism. When the decimal trip lever 335 is located axially in its rearward or operative position and the carriage is located so that the master wheel 169 is in the units of dollars position of a register and a numeral key is depressed, the V-shaped projection extending upwardly at the end of the lever is engaged by the V-shaped cam 351 (see Fig. 3) projecting downwardly from the plate 283 secured to the base of the register. By the engagement of this cam with the decimal space lever, the lever is swung downwardly and the wire 341 is elevated to hold the escapement pawl 123 out of position to engage the escapement wheel 121, Fig. 2, until the carriage has executed a two space or double escapement movement. This movement of the carriage disengages the projection on the decimal space lever from the cam 351 and the parts are then restored to their normal positions by the action of the coil spring 353 on the lever 343. With the decimal space lever located in its forward position, the V-shaped projection at the end thereof will not engage the cam 351 during the passage of the carriage through the zone of a register.

The decimal space lever is moved axially into and out of position to be engaged by the cam 351 by longitudinal movement imparted to the rock shaft 337 upon which the lever is mounted. The rock shaft 337 is acted upon by a coil spring 367 which constantly tends to move the same rearwardly to locate the decimal space lever in operative position. The lever is shifted into operative position by the movement of the state control lever 315 from "Write" to "Total" position and remains in operative position when the control lever is shifted from "Total" to "Compute" position and from "Compute" back to "Total" position. The lever 335 is shifted back out of operative position by the movement of the state control lever from "Total" to "Write" position. Thus the decimal space mechanism is rendered operative when the state control lever is adjusted in "Total" or "Compute" position as is done respectively when a subtotal or a total are taken.

The decimal space mechanism including the state control lever and the connections for controlling the decimal space mechanism from said lever has substantially the same construction, arrangement and mode of operation of parts as the corresponding mechanism illustrated and described in the co-pending application of Oscar J. Sundstrand, Ser. No. 552,656, filed Sept. 4, 1944.

*Crossfooter register mechanism*

As shown clearly in Figure 2 of the drawings, the shaft 171 is extended beyond the side plates 195 of the type carriage at each end of said carriage and right and left-hand cross-computing registers or crossfooters 373 and 375 are mounted at the respective ends of the carriage. The totalizer mechanisms of these crossfooters are connected respectively with the ends of said shaft for operation by the shaft. The totalizer mechanisms of the crossfooters preferably are substantially identical and each of these mechanisms has the same general construction, arrangement and mode of operation of parts as the corresponding mechanism illustrated and described in the patent to Foothorap No. 2,145,254, dated January 31, 1939.

The mechanism for driving the totalizer of each crossfooter (see Fig. 5) comprises a master wheel 200 mounted on a shaft 202 to rotate therewith but shiftable longitudinally of the shaft to select the denomination of the totalizer mechanism corresponding with the denomination in which the master wheel 169 is located with relation to the column register. The master wheel 200 is driven by mechanism similar to that shown and described in Foothorap patent, No. 1,847,429, dated March 1, 1932, and in Foothorap Patent No. 2,032,691, dated March 3, 1936. The master wheel shaft 202 is journaled in bearings in the side plates 377 (see Fig. 2) of the crossfooter frame and is driven from the actuator shaft 171 through a gear 379 fixed to said shaft and meshing with a gear 381 journaled on and shiftable axially of the shaft 383 fixed to one of the side plates 377. When the machine is set for addition, the gear 381 is arranged to mesh with a gear 385 secured to the master wheel shaft. To set the crossfooter mechanism for subtraction, the gear 381 is shifted axially out of engagement with the gear 385 and into engagement with one section of a twin gear 387. The gear 387 is journaled on a shaft 389 secured to the adjacent side plate 377 and the other section of said gear is constantly in mesh with the gear 385, the gear 387 rotating idly when the machine is set for addition.

The valve indicating wheels 194 are journaled on a shaft 391 mounted in the supporting plates 377 of the crossfooter frame and are arranged to be driven in opposite directions respectively, for addition and subtraction by toothed denominational number wheels 198 journaled side by side on the shaft 393 supported in the crossfooter frame plates 377, said number wheels being connected with the value indicating wheels by intermediate gears 196. The number wheels 198 are driven, denomination by denomination, by the master wheel 200 which is arranged to mesh with said number wheels. The master wheels of the two crossfooter registers are respectively shifted axially step by step to the right, looking at the front of the machine, into engagement successively with the wheels 198 to select the denominations corresponding to the denominations of the column register wheels successively engaged by the master wheel 169 by mechanism described later in this application.

Each crossfooter register is provided with a two-way transfer mechanism of the type illustrated and described in Patents No. 2,032,691 and No. 2,145,254, referred to above. This mechanism (see Figure 5) includes a series of transfer heads 204, one for each denomination, mounted to rock upon a fixed shaft 206 to either side of a central normal position. Rocking movement of a transfer head is effected initially by the engagement of a wide tooth 206c on the corresponding denominational number wheel 198 with a trip member 223 on the head arranged in the plane of said tooth to rock the head in one direction or the other at the time in the movement of said wheel at which a transfer is required. Movement of the head is continued in the direction in which it is initially rocked by actuating mechanism including a bell crank actuator lever 214 pivoted at 216 on the frame of the crossfooter, a spring 218 connected with the downwardly extending arm of the lever and urging the forwardly extending arm of the lever toward the axis of the head and a link connection 208 between the head and the latter arm of the actuator lever. The arrangement of each head and its actuating mechanism is such that, in the normal position of the parts, they assume a dead-center position providing a toggle lock resisting the action of the spring 218, in which position they are yieldingly held by a pivoted detent 220 urged by a spring 222 against a roller 224 mounted on one end of the link 208. Combined carrying fingers and locking dogs 228 tensioned by springs 219 are mounted on each head and are each provided with a projection arranged in the plane of the next higher denominational number wheel 198 to impart the carrying step of movement to said wheel upon the rocking of the head.

*Transfer resetting mechanism for crossfooter register (see Figs. 7 and 8)*

After each of the transfer heads 204 is rocked into inclined position in the manner above described, to execute a carry, the head remains in this position until it is positively restored to the normally or upright position shown in Fig. 5. The present machine is provided with mechanism which operates, immediately after the master wheel 169 leaves the units of cents position in a column register, to restore automatically the transfer mechanism of the crossfooter or crossfooters which may then be in operation. This mechanism comprises a rod or shaft 401 carried by spaced arms 403 secured to a rock shaft 405 mounted to turn in bearings in the crossfooter frame. In restoring the transfer mechanism, the rock shaft 405 is turned in a clockwise direction (Fig. 5) thereby swinging the rod 401 downwardly into engagement with the projecting ends 407 of any of the actuator levers 214 which may have been swung upwardly out of normal position by the rocking of a transfer head, thereby swinging the horizontally extending arms of said levers downwardly therewith. This restores the links 209 and the transfer heads to their normal positions shown in Fig. 5.

The mechanism for thus actuating the rock shaft 405 has the same construction, arrangement and mode of operation as the corresponding mechanism illustrated and described in the patent to Sundstrand No. 2,362,222, dated November 7, 1944. The said mechanism comprises an arm 409 on said rock shaft, a lever 411, and links 417 connecting the arm and lever for turning the rock shaft in one direction and an arm 419c on said rock shaft, a lever 421 acted on by spring 427 and links 425 connecting the latter arm and lever for turning the rock shaft in the opposite direction. The lever 411 is connected by a pitman 429 with a crank pin 431 fixed in a disk 433 journaled on a stud 435 supported on one of the side plates on the frame of the type carriage, the lever having a pin and slot connection with the pitman to provide lost motion. The lever 411 is oscillated by means of a one revolution clutch of which the disk 433 constitutes one element. The clutch also comprises a clutch pawl 445 pivoted on the disk, a toothed driving wheel 447 arranged to be engaged with the pawl and gears 451 and 453 through which the driving wheel is itself driven. The clutch mechanism further comprises a release lever 455 pivoted at 457 and a detent stud 461 mounted on the lever for engaging the pawl. The release lever 455 is actuated to move the detent stud 461 to release the pawl 445 and allow the same to engage the toothed wheel 447 to drive the disk 433 by means of pins 511, 511*a* supported respectively on the slides 479, 481 and arranged to engage projections 509, 509*a* on a lever 501. The lever 501 is pivoted at 503 on the release lever and is acted upon by a spring 463 which holds the lever 501 normally in the position on the release lever shown in Fig. 8 with a projection 505 on the latter lever in engagement with the pin 507 mounted on the release lever. The release lever thus is actuated to throw the one revolution clutch into action when one or the other of the slides 479, 481 is released by the action of the corresponding coupling dog and moves to the left under the influence of the corresponding slide actuating spring 487, by the engagement of one of the pins 511, 511*a* with the corresponding projection on the lever 501. All of the parts above briefly referred to have the same construction, arrangement and mode of operation as the corresponding parts of the mechanism shown in said patent, No. 2,362,222.

The present machine is provided with mechanism for moving the master wheel 200 of each of the crossfooter mechanisms to the right, Figs. 1 and 6, from denomination to denomination along the series of numeral wheels 198 during the passage of the master wheel 169 of the column register actuating mechanism through the several denominations of a column register, having the same construction, arrangement and mode of operation of parts as the corresponding mechanism illustrated and described in Patent No. 2,145,254, and in part in Patent No. 2,032,691, referred to above. Each master wheel 200 is shifted by a master wheel carriage 469 movable on a guide 469*a* (see Fig. 6) in the direction of the axis of the wheel and connected by a link 471 to a forwardly extending crank arm 471*a* fixed to the upper end of a vertical rock shaft 473 mounted to turn in bearings in the crossfooter framework. A rearwardly extending arm 475 is fixed to the lower end of said shaft and is connected by a link 477*a* with one of a pair of longitudinally slidable coupling bars or slides 479 and 481 (see Figs. 6 and 8), one for actuating each of the master wheel carriages. These bars are mounted side by side between a pair of laterally spaced housing plates 483 secured to the frame of the type carriage and said bars slide between upper and lower series of rolls 485. The rock shafts 473 are each acted upon by a coil spring 487 connected, in one crossfooter, with the arm 471*a* and, in the other crossfoooter, with the arm 475 which tends to swing each shaft in a direction to maintain the corresponding carriage 469 in starting position with the master wheel 200 in a position just above or to the left of the first numeral wheel 198. These springs, acting through the connecting mechanism, urge the coupling bars 479 and 481 to the left (Fig. 8). A coupling dog 489 is pivoted at 491 upon each of the coupling bars and is acted upon by a coil spring 493 which tends to swing the same upwardly into position to engage and interlock with a lug 495 on the base of each column register. A pin or stud 497 is mounted on each of the coupling dogs 489 and engages in an elongated slot 499 formed in the adjacent housing plate 483, the stud cooperating with cams formed at the opposite ends of the slot to swing the dogs downwardly out of engaging position with relation to the lug 495 on the column register.

Normally the dogs 489 lie in their upper or operative positions, one behind the other as illustrated in Fig. 7, with the pins 497 located in the left-hand portions of the corresponding slots 499 (Fig. 8) and adjacent to the respective cams at the ends of the slots. When the carriage has advanced the printing point to a position within one letter space of a columnar position on the work sheet in which a number is to be printed or a position at which the master wheel 169 of the column register actuating mechanism is within one space of the first number wheel 167 of a column register, the coupling dog or dogs 489 which are in operative position will engage the lug 495 on the column register and will hold the corresponding coupling slide or slides stationary during the continued advance of the carriage. Because of the relative movement of the carriage upon which the crossfooter mechanisms are mounted and the slides 479 and 481, the corresponding master wheel or wheels 200 will be advanced to the right from denomination to denomination across the corresponding series of numeral wheels 198. When the master wheel 169 advances one step beyond the lowest denominational order of a column register, the pin on each coupling dog, which is then connected with the lug 495, engages the cam at the right-hand end of the corresponding cam slot 480 and the dog is depressed out of engagement with the lug thereby releasing the corresponding coupling slide. Each rock shaft 473 is then swung by the corresponding spring 487 in a direction to carry the master wheel 200 back to its normal or starting position and the corresponding coupling slide is moved back to the left to its starting position shown in Fig. 6.

*General description of selector mechanism*

The machine illustrated in this application is provided with a total taking mechanism applied to the right hand crossfooter. When a total has been set up or registered in the right hand crossfooter, this total may be automatically analyzed and printed on the work sheet and the crossfooter cleared by the total taking mechanism hereinafter described.

Hereafter, in this application whenever the crossfooter is referred to in connection with the total taking mechanism, it is to be understood that the right hand crossfooter is meant unless otherwise specified.

The indicating wheels of the crossfooter each have a code disk attached thereto so that the code disk rotates with the indicating wheel and the rotary position of the disk corresponds with the rotary position of the indicating wheel. The code disks are sensed or analyzed by means of a series of feelers arranged to engage successively these code disks. The feelers are mounted on the master wheel carriage for movement with the master wheel of the crossfooter in the direction of the axis of the code disks. The master wheel carriage is normally located to position the master wheel to the left of the accumulator train of the totalizer of the crossfooter of the highest denomination and the feelers are then located by the carriage to the left of the left-hand code disk or that disk attached to the indicating wheel of highest denomination. In taking a total automatically, the master wheel carriage is shifted to shift the master wheel from denomination to denomination of the accumulator trains of the totalizer of the crossfooter beginning with the highest denomination and is held stationary with the master wheel in registry with the accumulator train of each denomination to enable said train to be cleared by the rotation of the master wheel as is done in the taking of totals by manual operation of the key levers in machines of this type. The respective positions and movements of the feelers during the total-taking operation corresponds with the positions and movements of the master wheel. That is, the feelers are shifted first into registry with the code disk attached to the indicating wheel of the accumulator train of the highest denomination of the crossfooter and is then shifted from denomination to denomination of the code disks to correspond with the shifting of the master wheel. After the completion of the total-taking operation, the master wheel carriage is shifted back to normal position to restore the master wheel and the feelers to their normal positions to the left of the accumulator train of the totalizer of the highest denomination.

During their shifting movements, the feelers are positioned radially out of position to contact with the code disks. During each cycle of operations of the feeler mechanism, starting immediately after the escapement movement of the type carriage, the carriage then being stationary and the feelers being located over one of the code disks, the feelers are depressed into engagement with the code disk to analyze the disk. After the selection of the type bar mechanism, the feelers are lifted out of engagement with the disk and are then advanced to the code disk of the next denomination by the movement of the master wheel carriage. The feelers are respectively connected with a series of longitudinally movable permutation code bars, and the positions of the feelers determine the longitudinal positions of these bars. The edges of these bars are engaged by a series of selectors, one for each numeral type bar. These selectors ar all given a forward movement during each cycle of operations, and when any one of the selectors is depressed into operative position, it will actuate by its forward movement, the corresponding numeral key lever 87 to engage the type bar operating mechanism with the fluted or toothed shaft 77. The selectors are controlled by the permutation bars so that one and one only of said selectors will be depressed into operating position during each cycle of the total-taking mechanism, the selector depressed corresponding with the position of the code disk analyzed by the feelers during the cycle.

*Feeler mechanism*

The feeler mechanism of the present machine (see Figs. 1, 11, 12, 13, 14, 15, 23 and 24) comprises a series of feelers 6 mounted on the master wheel carriage for movement therewith and for vertical movement with relation to said carriage. The feelers are mounted in spaced relation for vertical sliding movements in the forwardly projecting portions 8 and 8a formed on the master wheel carriage, the feelers operating in suitably formed slots, respectively, in said portions of the carriage. The slots in said forwardly projecting portions of the carriage are closed by means of a retainer plate 8b attached to the master wheel carriage and having forwardly bent slot closing arms 8c and 8d as shown in Fig. 14.

The movement of the master wheel carriage shifts the feelers successively over the code disks 12, one of which is attached to each of the indicating wheels 194 of the totalizer mechanism of the crossfooter. When the master wheel is located in registry with the wheel 198 of the accumulator train, the feelers are located in registry with the code disk 12 of said train. As stated above, the master wheel carriage is normally located to position the master wheel to the left of the accumulator train of highest denomination of the crossfooter and to position the feelers to the left of the code disk attached to the indicating wheel of said train.

In each cycle of operations, the master wheel carriage is shifted to the right to locate the master wheel 200 in registration with the number wheel 198 of an accumulator train of the crossfooter and to locate the feelers 6 in registration with the corresponding code disk 12, the feelers being lifted during said movement of the carriage. The feelers are then depressed into engagement with the code disk. The positions of the feelers control a selector mechanism for selecting the type bar which is to be actuated in the cycle. Following the setting of the selector mechanism by the positioning of the feelers, the selected type bar mechanism is actuated to print on the work sheet a number corresponding with the position of the indicating wheel. Immediately following the printing of the number on the work sheet, the corresponding differential mechanism is actuated to rotate the master wheel to clear the accumulator train engaged by said wheel. This completes the cycle.

These cycles of operation are repeated to print the total appearing in the crossfooter register and to clear the register, digit by digit, until the total printing and clearing operations are completed.

Each of the code disks 12 preferably has substantially the construction illustrated in Figs. 23 and 24. As shown in these figures, each code disk is provided with a periphery having certain elevated portions and depressed portions or notches formed in accordance with a predetermined code. There are ten differently formed code portions on the code disks, having a code formation corresponding to the numbers from "0" to "9" inclusive. The several code portions of the disk shown in Fig. 24 are bracketed. It will be noted that, as shown in each of these figures, the elevations on each code portion of the disk hold the feelers, when engaged therewith, in elevated positions, and that the depressions or slots in each code portion allow the feelers to drop to depressed positions.

Upon the upper edge of each of the feelers 6 rests a vertically movable bar 14 (see Figs. 11, 12 and 13) mounted upon the laterally extending arms of two bell crank levers 16 pivoted at 18 on the frame of the type head or carriage 7, the rounded ends of said arms of the bell cranks engaging in slots 20 formed in the opposite ends of the bar. The vertical movements of each of the bars 14 impart horizontal movements to one of the bars 22 mounted to slide horizontally upon the said type head and having slots 23a in which engage the rounded ends of the upwardly extending arms of the bell cranks 16. The bars 22 are slidably mounted on the type head by means of studs 24 secured in the frame of the type head and engaging in slots 26 in the bar.

With the above construction, the lateral position of each of the bars 22 is determined by the vertical position of one of the feelers 6. To the left-hand end of each of the bars 22 is connected the right-hand end of one of the code bars 28 which determine the numerals which are printed during the several cycles of the machine. The code bars 28 are connected with the respective bars 22 by means of a hook 28a formed on each bar 28 which engages with a hook 22a, Figs. 11, 12, 13, formed on each bar 22.

The mechanism for raising and lowering the feeler bars 6 comprises an actuator 30 having an arm or bar 32 mounted for vertical movement in slots in the forwardly projecting portions 8 and 8a on the master wheel carriage 469 by the side of the feeler bars. This actuator is provided with a rearwardly extending arm 34 projecting beneath each of the arms 10 on the feeler bars and engaged by said arms 10. The actuator is also provided with a shorter arm 34a (see Figs. 13 and 14) extending rearwardly beneath a vertically movable bar 36 mounted by the side of the forward bar 14 and supported in a manner similar to said bar. The actuator 30 is further provided with an upwardly extending arm 38 having a rearwardly bent extension 40 projecting over the upper edge of the bar 36, as shown in Figures 13 and 14. This construction enables the actuator 30 to slide along the bar 36 during the movements of the carriage 469 but the actuator is moved vertically with said bar during the vertical movements of the bar.

The bar 36 is mounted upon the horizontally extending arms of bell cranks 42 pivoted at 44 on the frame of the type head, the said arms of the bell cranks engaging in slots 44a formed in the ends of said bar. The upwardly extending arms of the bell cranks are tied together by the engagement of the same in slots 44b formed in a longitudinally movable bar 46 mounted on the type head for horizontal movements by means of the pins or studs 24 which engage in slots 50 in the bar.

The bars 22 are separated by spacing plates 26a and one of these plates separates the forward bar 22 from the bar 46. A spacing plate 26a also is located back of the rear bar 22 in spaced relation to the backing and supporting plate 26b fixed to the frame of the type head. The spacing plates are mounted upon screw studs 26c and 26d supported on the backing plate 26b and passing through corresponding openings in the spacing plates and in the forward plate 26e. The screws 26c pass through and form pivots for the bell crank levers 16 and for the similar bell crank levers 42 hereinbefore referred to. The spacing plates also separate the bars 14 from each other, and the forward bar 14 from the bar 36. The backing plate 26b, spacing plates 26a, and the forward plate 26e enclose and form guides engaging lateral faces of the bars 22, the bar 46, the bars 14, and the bar 36. The pins 24, supporting the bars 22 and 46, fit in openings in the four forward spacing plates 26a and are held from endwise movement by the engagement of the forward plate 26e and the backing and supporting plate 26b with the forward and rear ends respectively of the pins.

The bar 36 is moved upwardly to lift the feeler bars prior to each denominational movement of the carriage 469, and prior to the return movement of the carriage to starting position, and is allowed to descend to permit the descent of the feeler bars when said bars are located in registration with a code disk. The mechanism for moving the bar 36 vertically comprises a link 52 (see Figs. 13 and 27), the upper end of which is formed with a forwardly extending projection 54 engaging in a slot 56 formed in the bar 36. The lower end of the link 52 is pivotally connected by means of an eccentric stud 58 to the arm 60 of a U-shaped lever, indicated as a whole at 62 and pivoted on a shaft 64 fixed to one of the side plates of the machine head. The lever 62 is formed with a blade 66 arranged to engage the inclined faces of the projections or teeth on a cam disk 68 fixed to the hollow shaft or bushing 70 mounted to turn on a fixed shaft 71a supported at its ends on the frame of the type head.

Formed on the lever 62 is a second arm 72 upon which is mounted a stud 74 having a square head arranged to engage the periphery of a timing disk 76 fixed to the bushing 70. The disk 76 is formed with projections or teeth 76a and with recesses or slots 76b between the teeth as clearly shown in Figs. 27 and 28. When the head of the stud 74 rests on the outer edge of one of the projections 76a of the disk, the arm 60 of lever 62 and the link 52 are held in elevated positions to locate the feelers 6 in their uppermost positions above the code disks. When the link 52 is depressed and the arm 72 of lever 62 is swung downwardly to engage the head of the stud 74 in one of the recesses 76b, the feelers 6 are located in lowered positions to engage one of the code disks 12. The link 52 is acted upon by a coil spring 76*c* connecting the same with the lever 120 hereinafter described, which spring tends to depress the link and to swing downwardly the arms 60 and 72 of lever 62.

*Selector mechanism*

Pivoted upon the shaft 64 is a second U-shaped lever 78, the arm 80 of which is connected by a stud 82 and a link 84 with an arm 86 fixed to a square shaft 88 having pintles 90 at its ends engaging in brackets 91*a*, Figs. 22 and 25, attached to the frame of the type head or carriage. To the shaft 88 is secured a series of brackets 92 upon each of which is pivoted at 94 a selector 96 acted upon by a coil spring 98 which tends to depress the forward end thereof. Each of the selectors 96 is formed with a spade-shaped pusher 100 arranged to engage the upwardly extending arm 102 of the corresponding numeral key lever 87. Each of the selectors may be held up in a position to locate the pusher blade 100 above the arm 102, on the corresponding key lever, so that the blade will not act on the key lever (see Fig. 3). The selector may be allowed to descend into a position back of the upper end of said arm, as shown in Fig. 25. To control the vertical position selectively of the selectors, each selector is formed with a forwardly extending arm 106 arranged to rest upon the upper edges of the four longitudinally movable control code bars 28 referred to above which are mounted for longitudinal movement in slots in supporting studs 110, Fig. 1, fixed to the upper portion of the frame of the machine head. The code bars 28 are each acted upon by a coil spring 104, Fig. 9, connecting an upwardly extending arm 108 on the code bar with a forwardly extending arm 108*a* formed on a fixed plate 110*a* attached by screws 112*a* to the frame of the type head of the machine. These springs tend constantly to move the code bars and the bars 22 to the left, Figs. 9 and 10 and to depress the bars 14 and the feelers. These code bars are provided with elevated, upper-edge portions 112 and with depressed upper-edge portions 114. When an elevated edge portion on any one of the code bars is engaged with the arm 106 on a selector, the blade 100 of said selector will be located above the corresponding arm 102 of the corresponding numeral key lever and the key lever will not be actuated by the selector during the movement of the selector-operating shaft 88. When depressed portions in all four selector code bars 28 are engaged with the arm 106 of a selector 96, the selector is held depressed in position to locate the blade 100 of the selector behind the arm 102 of the corresponding numeral key lever, and, as the selector-operating shaft 88 is given a clockwise movement, Fig. 27, the selector 96 will operate the key lever to connect the corresponding type-bar mechanism with the fluted shaft 77. The longitudinal positions of the code bars are controlled, respectively, from the longitudinally movable bars 22 and the longitudinal positions of these bars are controlled by the feelers 6 as the code disks are sensed.

Upon the arm 80 of the U-shaped lever 78 is mounted a roller 116 arranged to engage a cam disk 118 fixed to the shaft 70. By the engagement of this disk with the roller, the lever 78 is actuated to raise and lower the link 84 and thereby actuate the shaft 88. Upon the shaft 64 is pivoted an escapement lever 120 having an inwardly directed blade 122 arranged to engage the cam projections on the cam disk 68 and having a set screw 124 mounted on the body of the lever and arranged to engage the corresponding portion of the lever 62 to actuate said lever to lift the link 52 and thereby lift the feelers of the sensing mechanism. The spring 76*c* tends to swing the lever 120 in a counterclockwise direction, Fig. 27. The lever 120 is actuated from each type-bar mechanism or, to be more specific, from the universal bar, during each typing operation or cycle. To an arm 78*a* of the lever 78 is attached a relatively light coil spring 78*b* which tends constantly to swing the lever upwardly. The weight of the parts together with the tension of the springs 98, however, is sufficient to overcome the tension of the spring 78*b* so that, when the arm 80 of the lever 78 is free to swing downwardly, said lever is swung downwardly against the tension of the spring 78*b*.

The lever 120 is connected with one of the arms 143, upon which is suspended the universal bar, by means of a link 120*a* pivoted at 120*b* to said arm and having, at its lower end, a slot 120*c* in which engages a rod 120*d* supported on the lever 120. Through the above connection, during each depression of the universal bar, the lever 120 is swung in a clockwise direction about the shaft 64.

*Winding mechanism for spring for operating control cam shaft (see Figs. 28 and 30)*

The control cam shaft 70, to which the disks 68, 76, and 118 are fixed, is mounted for rotation on the fixed shaft 71*a* and is rotated to actuate certain parts in the total-taking operation by means of a suitable spring. This spring is normally maintained in a wound-up or tensioned condition so that it tends to rotate the shaft 70 in a counterclockwise direction, Fig. 28, and the shaft is released to the action of the spring, upon the upward movement of the total-taking key lever after it is depressed. The spring for rotating the shaft 70 consists of a spiral spring 126, Fig. 28, one end of which is attached to a stud 128 fixed to the cam disks 118, 68, and 76. The other end of the spring is connected to a stud 130 fixed to a ratchet wheel 132 mounted on a bushing 133*a*, Fig. 30, also journaled on the shaft 71*a* inside the cam disk 118. The ratchet wheel 132 is rotated step by step in a counterclockwise direction, Figs. 28 and 30, to wind up the spring 126. The mechanism for rotating the ratchet wheel comprises a link 134 pivoted at 136 on a lever 138 pivoted at 140 to the frame of the machine head. The lower end of the link 134 slides on a pin 134*b* fixed to the frame and engaging in a slot 134*a* formed in the link. The link 134 carries, at its lower end, a pawl 142 pivoted at 144 on the link and acted upon by a spring 146. This spring tends to maintain the acting or toothed end of the pawl in engagement with the peripheral teeth on the ratchet wheel 132. The lever 138 is acted upon by a coil spring 148, the lower hooked end of which is engaged in any one of a series of notches 148*a* formed in said lever at the upper side of a slot 148*b* therein. This spring maintains the upper edge of the lever in engagement with a roller 150 journaled on a stud 152 mounted in an eccentric position on a disk 154 fixed to one end of the fluted shaft 77, by which the type-bar mechanisms are actuated. By adjusting the spring 148 in the different notches 148*a*, the force exerted by the spring tending to lift the forward portion of the lever may be adjusted.

During the normal operation of the machine, the ratchet wheel 132 is free to turn in both directions, and, as the link 134 is reciprocated vertically, by the action of roller 150, the ratchet wheel turns in a counterclockwise direction, Fig. 30, during the upward movement of the link, under the action of the pawl 142, and then turns back in the opposite direction, under the action of the spring 126 during the downward movement of the link. Upon the depression of the total-key lever, however, a pawl is thrown into operation which, after the movement of the ratchet wheel in a counterclockwise direction, produced by the upward movement of the link 134, prevents the ratchet wheel from returning in a clockwise direction so that the spring is wound up step by step by the reciprocation of the link 134. When the spring 126 reaches a predetermined tension, its force, tending to turn the ratchet wheel 132 in a clockwise direction, will equal the force of the spring 148, so that the spring 126 will not be wound any further.

The mechanism for holding the ratchet wheel 132 from turning back in a clockwise direction, after its movement in a counterclockwise direction, comprises a pawl 158 formed on a lever 160 pivoted at 162 on bracket 164 attached to the frame of the machine head. This pawl is acted upon by coil springs, 166 and 166*a* which tend to swing the same in a clockwise direction, Fig. 30, to engage the pawl with the ratchet wheel 132. The pawl, however, is normally maintained out of engagement with the ratchet wheel by means of a pawl retainer 168 pivoted at 170 on the total-key lever 172, which lever is pivoted on the shaft 174 mounted in the frame of the machine head. The retainer 168 is acted upon by a spring 168*a* which tends to swing the same in a counterclockwise direction, Fig. 30, about the pivot 170. The key lever 172 is acted upon by a coil spring 172*a* which tends to raise the forward key carrying portion of the lever and the movement of the lever in opposite directions is limited by means of a stop stud 172*b* mounted on the frame of the type head and arranged to be engaged by spaced stop faces 172*c* on the lever. The pawl retainer is formed with an arm 176 having a forwardly directed finger 178 arranged to engage a pin 180 fixed to the lever 160. The retainer 168 is provided with a second arm 182 spaced from the arm 176 and formed with a projection 184 which normally rests against a pin 186 mounted on the frame of the type head. Thus, when the key lever 172 is in elevated position, the retainer 168 is located in normal position, with the end of the projection 184 resting against the pin 186, and with the finger 178 engaged beneath the pin 180, thereby holding the pawl carrying lever 160 in position with the pawl 158 out of engagement with the ratchet wheel 132. Upon the depression of the key lever 172, projection 184 is carried downwardly and to the left beyond the pin 186, and the finger 178 is moved downward and to the left away from the pin 180, and, when the projection 184 is completely disengaged from the pin 186, the retainer is swung downwardly and to the right until the arm 182 rests against the pin 186. During the continued downward movement of the key lever, after the pin 180 is released by the projection 178, the pawl lever 160 is still held in position to hold the pawl 158 out of engagement with ratchet wheel 132 by a latch 188 pivoted at 190 on the bracket 164 and having a shoulder 192 arranged to engage a tail 192*a* on the lever, the latch lever being yieldingly held in latching position by spring 166*a* which is connected at its lower end to the lever. At a point adjacent the end of the downward movement of the key lever, the lower end of the arm 176 engages the latch lever 188 and depresses the same, thereby releasing the pawl lever 160 and allowing the same to be actuated by springs 166 and 166*a* to engage the pawl 158 with the ratchet wheel 132.

Upon the elevation of the key lever, the retainer 168 moves diagonally upwardly, and to the right, Fig. 30, until the movement of said parts is stopped by the engagement of the projection 184 with the pin 186, the arm 182 sliding along the upper side of said pin during this movement of the retainer. The upward movement of the retainer is thus arrested slightly before the finger 178 engages the pin 180. The retainer 168 is held substantially in this position during the rotation of the ratchet wheel 132 to wind up the spring 126 until the stud 130 engages the retainer and swings the same upwardly, and to the left. This movement of the retainer carries the lower end of the projection 184 upwardly and to the left beyond the pin 186, and the retainer is then moved a short distance upwardly and to the right by the final upward movement of the key lever, which locates the projection in a position opposite the pin 186. This final upward movement of the retainer, through the engagement of the finger 178 on the same with the pin 180, actuates the lever 160 to carry the pawl 158 out of engagement with the ratchet wheel 132. The latch lever 188 then swings upwardly to carry the shoulder 192 to the left of the tail of the pawl lever 160 to hold the latter lever in pawl disengaging position against the action of the springs 166 and 166*a*. The rotation of the ratchet wheel finally brings the stud 130 substantially to the position shown in Fig. 28, thereby releasing the retainer 168 and the retainer is restored by the spring 168*a* to its normal position, with the end of the projection 184 resting against the pin 188.

*Mechanism for controlling rotation of cam disk assembly from total key lever (see Figs. 28 and 29)*

The total key lever 172 is formed with a recess 338 in which engages a projection at the end of the upwardly extending arm of a lever 340 fixed to a rock shaft 342 mounted in the frame of the type head. Loosely pivoted on the shaft 342 is a lever 344 connected with the lever 340 by means of a pin 346 mounted on said lever and engaging in a slot 348 in the forwardly extending arm of the latter lever. The lever 344 is formed with a shoulder 350 arranged to be engaged by the flat side of the pin or stud 128 fixed to the cam disk assembly 118, 76 and 68, to hold the disk assembly from rotation. The engagement of the pin 128 with the shoulder 350 on lever 344 holds the disk assembly from rotation when the total-key lever 172 is in its upper position. Upon the depression of the key lever, the lever 340 is swung in a direction to lift the lever 344, and thereby disengage the shoulder 350 from the stud 128. The disk assembly is then held from rotation by means of a finger 354 formed on the lever 340 which, by the swinging movement of the lever, is moved upwardly into position to engage the flat side of a second stud 356 also mounted on the disk 118. The engagement of this finger with the stud holds the disk assembly from rotation as long as the total key is held depressed. The end of the finger 354 is located so that there is a slight rotary movement of the cam disk assembly following the release of the same by the lever 344 before the rotation of said assembly is arrested by the finger. This slight rotary movement of the disk assembly carries the stud 128 beneath the curved face 358 of the lever 344.

Upon the release of the key lever, the finger 354 is swung downwardly out of engagement with the stud 356, allowing the disk assembly to rotate. During this rotation, the curved face 358 of the lever 344 engages first the stud 128 and then the studs 360 and 360a, also fixed to the cam disks.

The stud 360a is somewhat longer than the studs 360 and is arranged to extend behind the stud 130 carried by the ratchet wheel 132 so that the stud 360a can not, at any time, get ahead of the stud 130. Thus, there is slightly less than a complete revolution between the position of the ratchet wheel 132 with relation to the disk assembly, when the coil spring 126 is completely wound up, and the position of said ratchet wheel with relation to the disk assembly when the coil spring is under its minimum tension.

It may happen that, after the total key lever is depressed and released, said lever is again depressed, before a rotation of the cam disk assembly is completed, and held down until the end of the total-taking operation and then released. Means including a pivoted stop dog 362 is provided for preventing this improper operation of the total key from causing a misoperation of the cam disk assembly and a consequent misoperation of the total taking mechanism. This means has no function in the normal operation of the cycling mechanism and therefore need not be described herein. The said means has the same construction and mode of operation as the corresponding mechanism illustrated and described in the copending application of Oscar J. Sundstrand, Serial No. 552,656.

The mechanism for entering numbers in the column registers is normally set for addition. The mechanism may be set for subtraction by depression of a subtract key. The crossfooters also may be normally in condition for adding and may be set for subtraction by the depression of said subtract key. The condition of the crossfooters may be controlled independently of the control of the column registers by means of cams on said registers. Thus when the type carriage is in a predetermined position, the right hand crossfooter, for example, may be set for subtraction by a cam on a column register. With the carriage in this position, the crossfooter may be shifted to adding condition by the depression of the subtract key. The same is true of the left hand crossfooter. The means for controlling the condition of the mechanism for entering numbers in the column registers and the means for controlling the condition of the mechanism for entering numbers in the crossfooters have the same construction, arrangement and mode of operation as the corresponding means illustrated and described in the Sundstrand application, Serial No. 552,656, referred to above.

*Cycle of cam disks and mechanisms operated thereby*

When the total taking mechanism is idle, the cam disk assembly and the parts operated by the cams occupy substantially the positions shown in Fig. 27.

Upon the release of the cam disk assembly produced by the depression and release of the total key lever 172, the assembly is rotated in a counterclockwise direction, Figs. 27 and 28, under the influence of the coil spring 126. During the first part of the rotation of the cam disk assembly, the rotation of the cam disk 76 carries the projection 76a, with which the said stud 74 is engaged, out of contact with said stud thereby releasing the lever 62. This lever is then actuated by one of the projections 68a on the cam disk 68 and by the spring 76c to depress the arm 60 of said lever and the link 52 to lower the feelers 6 into operating position, the lever 120 having previously been swung counterclockwise, Fig. 27, by the spring 76c to its limiting position. As the cam disk assembly continues to rotate, the projection 118a on the cam disk 118, which was engaged with the roller 116, releases said roller, the lever 78 is swung counterclockwise and arm 80 is depressed by gravity and the action of springs 98 (Fig. 25) to advance the type-bar selectors 96. One of these selectors is then in lowered position and actuates a key lever 87 to connect the corresponding type-bar mechanism with the continuously rotating toothed shaft 77. During the operation of said mechanism to advance the type bar, the initial step in the escapement movement of the type carriage takes place but this escapement movement is relatively slight. This type-bar mechanism, in its operation, depresses the universal bar 145 and through the link 120a, the lever 120 is swung clockwise, Figure 27, to swing the lever 62 clockwise to lift the arms 60 and 72 of said lever. The lifting of the arm 60 raises the link 52 to carry the feelers to their upper positions and the lifting of the arm 72 carries the stud 74 above the outer edge of the next projection 76a on the disk 76 and said projection is carried under the stud by the further rotation of said disk. These movements of the levers 62 and 120 place the blades 66 and 122 of said levers between two cam projections 68a on the disk 68. At about the same time, the arm 80 is lifted by the engagement of a projection 118a on the disk 118 with the roller 116 to raise the link 84 and restore the selector actuating mechanism and the selectors to normal positions. During the further rotation of the cam disk assembly, following the above-described actuation of lever 120, a projection 68a on the disk 68 engages the blade 122 on the lever 120 thereby holding up the rotation of the disk until the type-bar mechanism moves back toward its normal retracted position and allows the universal bar 145 to swing upwardly and the lever 120 to swing counterclockwise under the influence of the spring 76c. During the retraction of the type bar, the second step in the escapement movement of the type carriage takes place, and this step constitutes the major part of the escapement movement. When the cam disk assembly is released by the counterclockwise movement of the lever 120 occurring upon the retraction of the type bar, the cycle of said assembly is completed to bring the same to the position shown in Fig. 27, ready to start another cycle. The above cycle of operations is repeated, one cycle for each denomination in the total entered in the totalizer of the crossfooter until the entire total is printed on the work sheet. During the taking of a total, the cam disk assembly executes nearly a complete rotation.

*Total taking—Clearing of crossfooter*

The total is always taken with the type carriage in a position on the space frame in the direction of letter spacing movement such that the master wheel 169 is in the zone of a column register having a subtraction cam such as the cam 600 shown in Fig. 3. Thus, when the totalizer of the crossfooter is in a positive condition, digits corresponding to those indicated by the indicating wheels 194 of the crossfooter and to those printed by the type bar mechanism will be subtracted in the several denominations of the totalizer thereby clearing the totalizer.

In taking a total from the crossfooter, the state control lever 315 is set in "compute" position and the type carriage is adjusted to locate the master wheel 169 in mesh with the wheels 167 of the accumulator train of highest order of the column register 163 which is to be used in the taking of totals, said lever having a subtract cam 600 and a pick up lug 495 for moving the master wheel carriage 469 of the crossfooter 373. This locates the master wheel 200 in registration or in mesh with the wheel 193 of the accumulator train of highest order of the crossfooter. The location of the type head in this position engages the addition and subtraction control mechanism for the crossfooter with the cam 600 on the column register and said control mechanism is thereby positioned to adjust the driving mechanism for the crossfooter into subtract condition. The total key is then depressed and immediately released. In taking a positive total, the said driving mechanism remains in this condition upon the depression of the total key. In taking a negative total, the depression of the total key adjusts said driving mechanism back into add condition through the lever 282, the lever 274, the link 270, the lever 266, the lever 248, the link 336*a*, the bell crank 334*a*, the link 338*a*, the arm 569, the rock shaft 567 and the connections between said rock shaft and the gear shift mechanism of the crossfooter all as shown and described in said application, Serial No. 552,656.

The depression and release of the total key lever, releases the cam disk assembly to the action of the spring 126 and said assembly is rotated in the manner above described to cause the machine to execute as many cycles as there are denominations in the crossfooter. During each cycle, mechanisms controlled by the cams on the cam disks of the cam disk assembly are operated to perform the following operations:

The feelers 6 are actuated to analyze the code disk of the indicating wheel 194 of the denomination with which the master wheel 200 is in registration, the code bars 28 are positioned in accordance with the positions of the feelers, the selector lever 96, corresponding to the number indicated by the wheel 194, is allowed to be depressed into operating position, said lever is advanced to actuate the key lever 87 to connect the corresponding type-bar mechanism with the continuously rotating fluted or toothed shaft 77 and the type-bar mechanism is actuated to print the digit indicated by the indicating wheel upon the work sheet. The depression of the universal bar 145 produced by the type impression movement or stroke of the type-bar mechanism, actuates the escapement to cause a relatively slight escapement movement of the type head.

The type-bar mechanism, in its type impression stroke, engages the corresponding differential actuator rack 173 with the power-driven toothed or fluted shaft 193 to drive the rack in an upward direction for the distance required for the subsequent operation of the differential mechanism. The rack is then disengaged from the shaft 193 and the differential mechanism of which it forms a part is moved in a downward direction by suitable springs. The differential mechanism during its downward or return movement, or during a part of said movement, is connected with the driving mechanism for the crossfooter register and the accumulator train with which the master wheel 200 is engaged is actuated in a direction to clear the indicating wheel of said train. The upward movement of the universal bar, during the retracting movement of the type-bar mechanism, actuates the escapement to allow the type head to execute the second step in the escapement movement. The greater part of the escapement movement occurs during this second step.

The above cycle of operations is repeated until the entire total in the crossfooter is printed and the crossfooter is cleared. The final escapement movement of the type carriage carries the master wheel 169 to a position one step beyond or below the lowest denomination of the column register and the master wheel 200 below the lowest denomination of the crossfooter and the carriage 469 is released during this final escapement movement and is restored to normal position, as shown in Fig. 6, by the spring 487, the master wheel 200 thus being located one step above or to the left of the highest denomination of the crossfooter.

All of the mechanisms of the present machine, above described or briefly referred to, have substantially the same construction, arrangement and mode of operation as the corresponding mechanisms of the machine shown and described in the Sundstrand application, Serial No. 552,656, referred to above.

*Mechanism for printing stars after a total*

The machine is provided with a star printing type-bar mechanism and means for controlling said mechanism to print one or more stars after a total. This control means preferably has the same construction, arrangement and mode of operation as the corresponding mechanism shown and described in the Sundstrand application, Serial No. 552,656, referred to above. All of the type bar mechanisms including the star printing type bar mechanism have substantially the same means for actuating the intermediate levers 51 from the fluted shaft 77 and substantially the same means for controlling the connection of the respective type bars with the said shaft. That is, each type bar mechanism includes a driving thrust link 69, a pawl 73 mounted on the link, a radius bar 63 and a transmitting link 57 connecting the driving link with the intermediate lever, a key lever 87 and a drag link 85 for connecting an upwardly extending arm on the key lever with the driving thrust link, these parts having the construction, arrangement and mode of operation described above. In the cases of the numeral type bar mechanisms, the said means for actuating the intermediate levers respectively are associated with corresponding differential mechanisms.

*Negative total taking*

When a totalizer of the above type is driven from a positive condition in a negative direction to a negative or credit balance condition, the accumulator train of highest order is driven from "0" to "9" at some point in the operation. Also the negative total is shown in complementary form in the indicating wheels of the totalizer.

The present machine is provided with a fugitive one mechanism which enters an additional one negatively in the units train of the totalizer of the crossfooter when the train of highest order is driven from a positive condition in a negative direction from zero to "9" and which enters an additional one positively in the units train of the totalizer of the crossfooter when the train of highest order is driven from a negative condition in a positive direction from "9" to zero.

The present machine is also provided with mechanism by which, when the totalizer of the crossfooter has been operated in a negative direction from a positive condition to reduce the train to a negative condition, thereby setting up a total in complementary form in said totalizer, and this total is analyzed by the feeler mechanism, the type bars are selected to print the true total on the work sheet. When the totalizer of the crossfooter is driven from a positive condition in a negative direction to reduce the same to a negative condition, mechanism is set for shifting the selector levers longitudinally of the code bars to complementary positions by the depression of the total key lever. Then, when the total key is depressed and released, the selector levers are shifted and latched in position. Thereupon the code disk feelers analyze the complementary indications on the code disks but the type bar selector levers select the numeral type bars for the digits making up the complement of the number indicated in the crossfooter. That is, a complement of the complement set up in the crossfooter is printed by the type bars. At the completion of the total taking operation the selector levers are unlatched and are automatically shifted back longitudinally of the code bars to normal positions.

Fig. 10 of the drawings shows, in dotted lines, the positions of the lower edges of the forwardly projecting arms 106 of the selector levers with relation to the code bars 28. There is one of the selector levers for each of the digits from "1" to "9," inclusive, a lever for "0" and a lever for star printing. The right-hand or normal position and the left-hand or complementary position of each lever are bracketed in Fig. 10, and the digit to which each lever corresponds is placed adjacent the bracket.

The formations of the upper edges of code bars 28 are such that, when the selector levers 96 are in their right-hand positions shown in Fig. 10 and the feelers 6 analyze the indication of a certain number on a code disk 12, the selector lever corresponding to this number will be allowed by the code bars to be depressed into operating position and that, when the selector levers are in their left-hand positions shown in this figure, and the feelers analyze the indication of a certain number on a code disk, the selector lever corresponding to the complement of said number will be allowed by the code bars to be depressed into operating position.

In order to locate the parts for taking a complement of a complement, the selector levers 96 are all shifted to the left from their right-hand positions shown in Fig. 10 to the left-hand positions shown in said figure. This is done by shifting the devices for supporting and actuating the levers.

As stated above, the levers 96 are pivotally supported upon the rock shaft 88 and are actuated by said shaft. The forwardly projecting arms 106 of the levers pass, respectively, through slots 230, Fig. 9, respectively, formed in the downturned portions 232 of a slide 234 mounted to slide longitudinally on the angle plate 236 attached to the frame of the type head. The slide 234 is held on the angle plate and guided during its longitudinal movements by means of studs 238 engaging, respectively, in slots 240 in the slide, washers 242 being placed between the heads of the studs and the slide. The rock shaft 88 is mounted for longitudinal movement in its supporting bearings on the brackets 91*a*. An arm 244, Figs. 25 and 26, projecting rearwardly from the slide 234 engages in a groove or slot 246 in the rock shaft 88 to cause the rock shaft to move longitudinally with the slide.

The mechanism for moving the slide 234 to shift the levers 96 and their actuating mechanism comprises a lever 248, Fig. 9, pivoted at 250 on a bracket 252 adjustably attached to the frame plate 254 of the machine head. The lever 248 is formed with an opening 256 adjacent the upper end thereof in which engages the reduced end of an arm 258 projecting forwardly from the slide 234.

With the above construction, the lever 248 is swung in a counterclockwise direction from the position shown in Fig. 9 to shift the slide 234, the shaft 88, and the selector levers 96 to the left to complementary positions with relation to the code bars 28. The mechanism for swinging said lever comprises a lever 266 pivoted on a stud 268 also carried by bracket 252 on which lever is fixed a pin 264 engaging in a slot 262 formed in a laterally extending arm 260 on the lever 248. The right-hand end of the lever 266, Fig. 9, is adjustably connected with the upper end of link or bar 270, the lower end of which is pivotally connected at 272, Fig. 31, with a lever 274 pivoted at 276 on the frame of the machine head. The lever 274 is provided with a recurved arm 278 which is pivotally connected at 280 with a lever 282 suspended by means of a link 284 upon a pin 286. This pin is supported on the rear end of the arm 288 of a U-shaped lever, pivoted on the shaft 290 supported on the frame of the machine head. The other arm 292 of this U-shaped lever carries, at its rear end, a pawl 294 (see Fig. 31). The lever 288, 292 is acted upon by a coil spring 294*a* which tends to swing upwardly, the arms 288 and 292, the pin 286, the link 284, and lever 282 and the upward movement of said parts is limited by the engagement of lever 282 with the shaft 174. The pawl 294 is pivoted on a stud 294*a* carried by the arm 292 and is acted upon by a coil spring 300 which tends to swing the same in a clockwise direction, Figs. 31 and 31*a*. The movement of the pawl 294, under the action of the spring, is limited by the engagement of an arm 302 on the pawl with the underside of the arm 292.

The wheel 198 of the accumulator train of highest order of the register is rotated in a clockwise direction, as viewed in Fig. 5, during the adding of a number in the said train and is rotated in the opposite or in a counterclockwise direction, during the subtraction of a number in said train. During the rotation of the wheel 198 of said train in a clockwise direction, the pin 306 mounted on the wheel engages the right-hand side of the pawl 294, Fig. 31, and swings the same in a counterclockwise direction about its axis against the tension of the spring 300, the pawl being restored to normal position by the spring when the pin 306 passes the pawl. During the rotation of the wheel 198 in a counterclockwise direction, the pin 306 engages the end of the pawl 294 and, because of the position of the pin with relation to the axis of the pawl, the pin does not swing the pawl about its axis but drives the same downwardly thereby swinging the arm 292 and the arm 288 of the U-shaped lever 288—292 therewith. This action occurs when the wheel 198 is turned from a zero position in a subtracting direction to a "9" position. The downward movement of the arms of the U-shaped lever causes the lever 282 to swing downwardly about its pivot 280.

The total key lever 172, as stated above, is pivoted on shaft 174 mounted on the frame of the machine head and carries a square stud 312, Fig. 31, which, when the lever 282 is in depressed position, engages a downwardly projecting hook portion 314 on the lever 282 as the key lever is swung downwardly to cause the machine to take a total. The lever 282 is held in its uppermost position by the link 284 and the U-shaped lever 288—292 at all times, except when a complement of a complement is to be taken. With the lever 282 in its uppermost position, the stud 312 will not engage the hook-shaped portion 314 of the lever 282 as the key lever is swung downwardly to cause the machine to take a total. When the number wheel of the accumulator train of highest order of the crossfooter is driven in a subtracting direction from zero position to "9" position, the driving of the U-shaped lever 288—292 downwardly carries the lever 282 downwardly to position the hook-shaped portion 314 in the path of the stud 312. With the lever 282 in this position, as the key lever is pressed downwardly, the stud 312 engages the projection 314 on lever 282 during the downward movement of the key lever and the lever 282 is moved rearwardly, thereby swinging the lever 274 in a clockwise direction, Fig. 31, about the stud 276 and moving the bar or link 270 downwardly thereby shifting the levers 96 and their actuating mechanism across the machine into positions to take a complement from the code disks of the register.

The lever 274 is held in complement-taking position by means of a latch 316 pivoted at 318 on the frame of the machine head and having a shoulder 320 arranged to engage a pin 322 mounted on the lever 274. The latch 316 is acted upon by a coil spring 324 which tends to swing the same in a counterclockwise direction, Fig. 31, into acting position.

The latch 316 is swung in a clockwise direction to release the lever 274 upon the automatic actuation of the transfer restoring mechanism of the crossfooter. To this end, a link 326 is pivoted at its lower end at 328 to the latch 316 and adjacent its upper end is formed with a curved slot 330, in which engages a pin 332 carried by an arm 334 attached to the rock shaft 405 of the transfer-restoring mechanism. As the rock shaft 405 is actuated to restore the transfer mechanism of the crossfooter, the arm 334 and the pin 332 are swung upwardly in the slot 330. During the greater part of the upward movement of the pin 332, the pin moves in the slot 330 in the link 326 and therefore does not move the link. As the pin approaches the end of its upward movement, it engages the upper end wall of the slot 330 and lifts the link 326, thereby actuating the latch 316 to disengage the pin 322 on the lever 274 and release said lever. Upon the release of said lever, the parts are moved back to their normal positions by the action of a suitable spring-actuated mechanism and the link or bar 270 is lifted to restore the levers 96 and their actuating mechanism to their normal right-hand positions, shown in Fig. 9.

The spring-actuated mechanism for restoring the link or bar 270 (see Fig. 9) comprises a bell crank lever 334*a* pivoted at 335*a* on the frame of the type head and a link 336*a* connecting the downwardly extending arm of said lever with the lever 248. The horizontally extending arm of the lever 334*a* is connected with the upper end of a vertically movable link 338*a* by means of a pin 340*a* fixed in said arm and engaging in a slot 342 in the link. The link 338*a* is yieldingly held in its uppermost position with the pin 340*a* in engagement with the lower end wall of the slot 342*a* by means of a coiled spring 344*a* suspended from the forward end of an arm 346*a* fixed to the frame plate 234, said spring being connected to the upper end of the link.

With this construction, as the link or bar 270 is moved downwardly, the bell crank lever 334*a* is swung in a counterclockwise direction, Fig. 9, and the spring 334*a* is stretched. Upon the release of the lever 274 by the latch 316, the bell crank lever 334*a* is swung back in a clockwise direction by the upward movement of the link 338*a* under the action of the spring 344*a* and the lever 248 is swung in a clockwise direction to restore the selector levers 96 to their normal right-hand positions. At the same time, through the action of the spring 344*a*, the lever 266 is swung in a counterclockwise direction to lift the link 270 and restore the levers 274 and 282 to their normal positions. The lower end of the link 338*a* is connected to the addition-subtraction control mechanism of the crossfooter shown and described in Sundstrand application, Serial No. 552,656.

*Mechanism for controlling printing of "0's," "9's," and characters such as stars in printing a total (see Figs. 9, 10, 11, 12, 13 and 16 to 21, inclusive)*

In addition to the code bars 28, the machine is provided with a longitudinally movable bar 492 mounted substantially parallel with the code bars. This bar also is engaged by the lower edges of the forwardly projecting arms 106 on certain of the selector levers 96 and its upper edge is formed with elevations and depressions similar to those on the bars 28 to control the selector levers engaged thereby. The formation of the upper edge of the bar 492 and its relation to the selector levers 96 engaged thereby are clearly shown in Figs. 10 to 12, inclusive, and 16 to 21, inclusive. The bar 492 is formed with elevations and depressions for controlling the three right-hand selector levers 96 which control the type-bar mechanisms respectively for printing the numbers "9" and "0" and the star signal. The positions of these levers are indicated in Fig. 10.

The bar 492 is mounted to slide laterally of the machine in slots in the studs 110 and its left-hand end, Fig. 9, is yieldingly held in elevated position by a coil spring 494 connecting the same with one of the arms 108*a* on the stationary plate 110*a* attached by screws 112*a* to the frame of the type carriage.

The right-hand end of the bar 492 is supported on the upwardly extending arm of a bell crank lever 16*a*, pivoted on one of the screw studs 26*c*. The bar 492 has elevations and depressions engaged respectively by the forwardly extending arms 106 of the selector levers 96 respectively for the type-bar mechanisms for the numerals "9" and "0" and for the star signal. The selector lever 96 for the star signal type-bar mechanism is the lever at the extreme right of the series of selector levers in the present construction, and the levers 96 for the "0" and "9" are the next two levers respectively toward the left from the star signal selector lever in said series.

The selector lever control bar 492 is normally located in its right-hand position shown in Figs. 9, 10, 11, 16, 17 and 19. The bar is yieldingly held either in this position or in its left-hand position shown in Figs. 12, 18, 20 and 21 by means of a pin 504 fixed to and projecting forwardly from the frame of the type carriage and arranged to engage in a recess 506 between two uprights 508 formed in the control bar 492. The bar 492 at the base of the recess 506 is formed with an inverted V-shaped edge 508*a* for engagement with the pin 504, this edge being held in engagement with the pin by the spring 494.

When the bar 492 is moved from its right-hand position toward the left or from its left-hand position toward the right sufficiently far to carry the apex of the V-shaped edge 508*a* beyond the pin 504, the coaction of said edge with the pin will cause the bar to move respectively to its limiting left-hand or right-hand position in which the pin is engaged respectively with the left or the right-hand upright 508 as shown in Figs. 11 and 12.

With the selector levers in normal or positive total positions as shown in Fig. 9 and the control bar 492 in its normal right-hand position as shown in Figs. 17 and 19, when a value wheel in the crossfooter showing a "0" is analyzed by the feelers, the "0" selector lever is held in elevated or inactive position by a projection on the upper edge of the bar 492, thereby preventing the printing of a "0" although all the code bars 28 are in positions for zero printing. It will be seen, however, from Fig. 10, that recesses respectively in the upper edges of all the code bars 28 and in the upper edge of control bar 492 are in opposed or aligned relation to the lower edge of the arm 106 on the selector lever for the star signal so that a star will be printed, provided that the lever 43 of the star printing type bar mechanism is operatively connected with the type bar.

With the selector levers in positive total-taking positions and the control bar 492 in its left-hand position as shown in Figs. 18 and 20, when a value wheel in the crossfooter showing a "0" is analyzed, the star signal selector lever will be held from being depressed into operative position by an elevated portion on bar 492. In this position of the parts, however, recesses in the code bars 28 and a recess in the control bar 492 will be in opposed relation to the lower edge of arm 106 on the selector lever for the "0" type-bar mechanism so that a "0" will be printed.

With the selector levers 96 in negative total or credit balance positions and the control bar 492 in its right-hand position as shown in Fig. 16, when a value wheel in the crossfooter showing a "9" is sensed by the feelers, the "0" (complement of "9") selector lever is blocked out of operation by a projection on the bar 492. In this case, recesses in all the code bars 28 and in the control bar 492 will be located in opposed relation to the lower edge of the arm 106 on selector lever 96 for the star signal type-bar mechanism so that said mechanism will be rendered operative to print a star signal, provided that the lever of the star type-bar mechanism corresponding to the lever 43 is then operatively connected with the type bar.

When the selector levers are in negative total positions and the control bar 492 is in its left-hand position as shown in Fig. 21, and a value wheel in the crossfooter showing a "9" is analyzed by the feeler mechanism, the star signal selector lever is blocked out of operation by a projection on the control bar 492. In this case, a series of recesses on the code bars 28 and a recess on control bar 492 lie in opposed relation to the lower edge of the arm 106 on selector lever 96 for the "0" type mechanism so that said mechanism will be actuated to print a "0."

With the parts in the positions shown respectively in Figs. 16 and 21, when a value wheel in the crossfooter showing a "0" is analyzed, a complemental "9" will be printed in a manner which will be readily understood from the above explanation.

With the parts in position for taking a positive or debit balance, as shown in Figs. 19 and 20, when a value wheel in the crossfooter showing a "0" is analyzed, the control bar 492 is maintained in its right-hand position. When any number from "1" to "8," inclusive, is analyzed in the crossfooter, the bar 492 is moved to its left-hand position by the movement of any one of the three bars 22 back of the forward bar 22. Each of these three bars is formed with an extension 510 arranged to engage a contact plate 512 formed on the bar 492 and extending forwardly therefrom beneath the code bars 28. The forward bar 22 is not provided with such an extension. In order that the control bar 492 may be moved to its left-hand position when a "9" in the crossfooter is analyzed by the feelers, a lever or slide 514 (Figs. 9, 17 and 18) is mounted to slide longitudinally on the lever 266 by means of guide studs 516 secured in the lever 266 and engaging in slots 518 formed on the lever 514. Thus the slide 514 is mounted to pivot with the lever 266 and to slide independently of said lever laterally of the machine. The slide 514 is formed with a portion 520 extending upwardly from the body of the slide and provided with a rearwardly bent portion 522 forming an interponent normally located between the left-hand end of the forward bar 22 and the contact plate 512 on the control bar 492 as shown in Fig. 17.

When the lever 266 is in normal position for the printing of a positive total, the slide 514 is located so that the interponent 522 is located between the left-hand end of the forward bar 22 and the contact plate 512 (see Fig. 17). With the parts in this condition, upon the analysis of a value wheel in the crossfooter showing a "9," the interponent 522 will be engaged by the bar 22 and moved to the left with said bar and, through the contact of the interponent with contact plate 512, the bar 492 will be moved to its left-hand position.

When the parts of the machine are located in positions for taking a negative or credit balance total, the swinging movement of the lever 266 in a clockwise direction and of the slide 514 therewith depresses the interponent 522 below the left-hand end of the forward bar 22 so that the interponent will not be engaged by bar 22 as the "9" in the crossfooter is analyzed (see Fig. 18). Under these conditions the bar 492 will not be moved to its left-hand position.

Means is also provided, in the present machine, which will operate, when the parts are in credit balance positions as shown in Fig. 16, and a value wheel in the crossfooter showing a "0" is analyzed, thereby causing the printing of a "9," to move the bar 492 into the left-hand position. Then when a value wheel in the crossfooter showing a "9," following the said value wheel showing a "0," is analyzed, a projection on the bar 492 will block the star selector lever and the "0" selector lever will be rendered operative to cause the printing of a "0."

The mechanism for moving the control bar 492 into its left-hand position under these conditions comprises a bell crank lever 524—524a (Figs. 17 and 18) pivoted at 526 on the frame of the type carriage and having an arm 542a arranged to engage a projection 528 extending upwardly from the body of the slide 514. The other arm 524 of the bell crank lever is arranged to be engaged by the upwardly extending arm 102 on the "9" key lever as said lever is actuated by the corresponding selector lever to render operative the "9" type-bar mechanism. The engagement of said arm of the "9" key lever with the bell crank will swing the bell crank from the position shown in Fig. 17 to the position shown in Fig. 18 and, through the engagement of the forwardly extending arm of the bell crank with the projection 528, the movement of the bell crank will shift the slide 514 to the left and the slide will move the bar 492 to its left-hand position.

The bar 492, after having been moved into its left-hand position, is moved back to its normal right-hand position after the completion of the printing of a total by mechanism actuated and controlled by the transfer resetting mechanism. To this end the bell crank lever 16a which supports the right-hand end of the bar 492 carries a pin 530, Figs. 13 and 22, fixed in the horizontally extending arm thereof and this pin is engaged by a contact plate 532 fixed to the upper end of and preferably formed integral with a vertically movable slide 534 mounted on studs 536 fixed to the frame of the type carriage and engaging in slots 538 formed in the slide. The slide is formed as shown in Fig. 22 and, at its lower end, is provided with an arm 540 which is arranged to be engaged by a roller 542 carried by the pin 332 fixed to the arm 334 as said arm approaches the end of its upward movement. By the upward movement of the slide 534 imparted thereto by the arm 334, the bell crank lever 16a is actuated to move the bar 492 back to the right to its normal position.

When the slide 514 is in its normal position, the projection 528 is located below the bell crank lever 524—524a and is not engaged by said lever upon the actuation of the "9" key lever.

In order to move the lever or slide 514 back to the right to its normal position after each analyzing cycle of the feeler mechanism if said slide has been displaced to the left, a bar 544a is attached by screws 546a to the forward code bar 28 and the right-hand end of said bar 544a is arranged to engage the interponent 522 on the slide 514 as shown in Fig. 18. With this construction, as the forward code bar 28 is moved to the right at the end of each analyzing cycle, if the slide 514 has been displaced to the left, the bar 544a engages the interponent 522 and moves the slide to the right with said code bar. To enable the bar 544a to be adjusted longitudinally of the forward code bar, said bar 544a is formed with slots 548a in which the screws 546a engage.

The action of the control bar 492 and the mechanism for positioning said bar to control certain of the type bar mechanism in printing totals will now be explained, referring to certain totals that are to be printed. Before the taking of a total, the control bar always occupies its normal right-hand position as shown in Figs. 9, 10, 17 and 19. In certain instances, the control bar is moved to its left-hand position shown in Figs. 18 and 20 during a total-taking operation and the control bar then remains in its left-hand position until the completion of the taking of the total.

With the construction shown in the Sundstrand application, Serial No. 552,656, in printing positive totals, a star is printed for each zero to the left of the first significant figure in the total analyzed by the feeler mechanism. In the construction shown in Figs. 1 to 38 inclusive, of the present application, the zeros in the total located to the left of the first significant figure in the denominations to the left of the decimal point position are not printed and no stars or any other characters are printed respectively for these zeros. For each zero in the total located to the left of the first significant figure in the denominations to the right of the decimal point position, a star is printed.

The star type bar mechanism is similar to the numeral and letter type bar mechanisms of the machine. The star type bar mechanisms comprise an intermediate lever 51a pivoted at its rear end on the transverse shaft 53, this intermediate lever being similar in construction and mode of operation to the intermediate lever 51 previously described. The intermediate lever 51a is swung downwardly about the shaft 53 by power to actuate the star type bar. The mechanism for swinging the intermediate lever 51a of the star printing mechanism downwardly comprises a radius bar, a transmitting link connecting the radius bar with the intermediate lever, a driving link pivoted at its lower end to the radius bar and a pawl carried by the driving link for engaging the fluted shaft. The driving link is swung forwardly about its lower end to carry the pawl into engagement with the fluted shaft by means of a key lever and a drag link connected at its forward end with the key lever. All of these parts have substantially the same construction, arrangement and mode of operation as the corresponding parts of the mechanism for actuating the lever 51 shown in Fig. 3 and described above.

The connections between the intermediate lever 51a and the star type bar 19a are such that certain parts of the same may be adjusted to cause the downward movement of the intermediate lever 51a under the action of the power driven mechanism to produce a partial actuation only of the type bar so that the type does not engage the work sheet and that by a different adjustment of said parts of the connections a full actuation of the type bar to engage the type with the work sheet may be produced by the downward movement of the intermediate lever under the action of said power driven mechanism.

The type bar 19a is pivoted at 21a on a hanger 23a secured to the underside of the type bar ring 25 suspended below the deck of the carriage. The type bar is acted upon by a coil spring 29a which operates to retract the bar and tends to retain the same in its normal condition with a projection on the type head in engagement with the semi-circular buffer ring 31. The tail of the type bar is connected by a link 33a with an elbow lever 35a pivoted at 37a upon a hanger 39a depending from the deck 27. The elbow lever 35a is actuated from the sub-lever 43a pivoted at 45a upon a support 47a secured to the upper face of the deck 27. The rear end of this sub-lever is connected by a link or push rod 27a with the intermediate lever.

The connection between the forward end of the sub-lever 43a and the elbow lever 35a comprises a connecting member 546 constructed as shown clearly in Fig. 34. This connecting member is preferably made from sheet metal and is bent to the shape clearly shown in said Fig. 34. The connecting member is pivoted loosely at its lower end to a headed stud 548 secured in the apex portion of the elbow lever 35a, this connection enabling the connecting member to be swung forwardly and rearwardly about its connection with the elbow lever. The connecting member is provided with a slot 550 adjacent its upper end in which engages the forward portion of an extension 552 secured by means of a screw 554 to the forward end of the sub-lever 43a, said extension being rigid with said sub-lever. This extension is preferably made of sheet metal cut and bent substantially into the form clearly shown in Fig. 33. This extension comprises a portion 556 having substantially the same shape as the forward portion of the sub-lever 43a and arranged to be placed against the side of said sub-lever and to be held in position by the screw 554, said portion having spaced lugs 558 arranged to extend on opposite sides of the sub-lever to hold the extension from swinging about the screw.

When the sub-lever 43a is actuated by the downward movement of the intermediate lever, the forward end of the sub-lever is raised and the connecting member 546 is lifted by the engagement of the upper edge of the extension 552 with the upper end wall of the slot 550 in the connecting member.

It will be noted, from Fig. 33, that the extension 552 is formed with an intermediate portion 552a, the upper edge of which is considerably above the upper edge of the forward portion 552b of said extension.

The connecting member is normally maintained in its forward portion with relation to the extension 552 as shown in Figs. 36 and 38. With said member in this position, the forward portion 552b of the extension engages in the slot 550 in said member and the extension has a great deal of lost motion in the slot during the upward movement of the forward portion of the sub-lever. The upper edge of the extension, therefore, engages the upper end wall of the slot 550 at a time relatively late in the movement of the sub-lever. Under these conditions, a partial stroke only is imparted to the star type bar and the star type is not engaged with the work sheet. During the taking of a total, the connecting member is shifted to its rearward position shown in Figs. 35 and 37. With the connecting member in this position, the intermediate portion 552a of the extension engages in the slot 550 and the extension has very little lost motion during the upward movement of the forward portion of the sub-lever. Under these conditions a full stroke is imparted to the type bar to engage the star type with the work sheet.

At the beginning of a total taking operation, the connecting member is located in the forward position shown in Figs. 36 and 38 and remains in this position during the analysis of all the denominations of the crossfooter up to the decimal point position. When the decimal point position is reached, the connecting member is shifted rearwardly to the position shown in Figs. 35 and 37 and remains in this position during the analysis of the two denominations to the right of the decimal point.

The mechanism for shifting the connecting member during a total taking operation comprises a lever 562 pivoted at 564 on the frame of the machine and having a U-shaped yoke or bridge portion 562a attached to the upper arm thereof and forming an extension of the lever, the said arm on the lever being connected to one arm only of the yoke. The other arm of the yoke is pivotally connected at 565 with the angular rear portion of the link 566. The forward end of the link 566 is pivotally connected at 568 with the upwardly extending portion of the arm 570 formed on the connecting member 546, said arm being bent in the form clearly shown in Fig. 34 with relation to the body of said member. The connecting member is acted upon by a coil spring 572 connected at its rear end with the link 566 and at its forward end with a bar 574 on the frame of the machine. This spring normally maintains the connecting member in its forward position, the forward movement of said member being limited by the engagement of the curved contact face 576 formed on the lever 562 with the pins 360, 128 and 360a. These pins are arranged with their axes in a circular arc having its center in the axis of the bushing 70. At a predetermined point in a total taking operation, the lever 562 is engaged by the pin 356, the axis of which is arranged at a greater distance from the axis of the bushing 70 than the axes of the pins 360, 128 and 360a. By the engagement of the pin 356 with the lever, the lever is actuated to move the connecting member 546 to its rearward position.

At the end of a total taking operation, when the rotation of the cam disks is arrested, the pin 356 is engaged with the end of the curved face 576 remote from the axis of the lever and the connecting member is located in its rearward position. Immediately after the cam disk assembly starts to rotate following the depression and release of the total key, the pin 356 is disengaged from the lever 562, the connecting member is moved into its forward position by the action of the spring 572 and the contact face 576 of the lever is engaged with the pins 360 as shown in Fig. 36. The connecting member remains in its forward position during the total taking operation until the analyzing mechanism reaches the decimal point position of the crossfooter, the pins 360, 128 and 360a passing along the contact face 576 of the lever during the analyzing of the several denominations of the crossfooter up to this point in the total taking operation. Because of the position of the connecting member during this period in the total taking operation, if any zero is analyzed to the left of the first significant figure of the total, a partial stroke will be imparted to the star type bar and no star will be printed.

When the analyzing mechanism is passing the decimal point position of the crossfooter, the lever 562 is swung in a clockwise direction to shift the connecting member to its rearward position shown in Figs. 35 and 37 by the engagement of the pin 356 with the lever. During the passage of the analyzing mechanism through the two denominations of the crossfooter, to the right of the decimal point position, the lever 562 is held in the position shown in Fig. 35 by the engagement of the pin 356 with the curved contact face of the lever thereby maintaining the connecting member 546 in its rearward position. Therefore, if a zero to the left of the first significant figure in the decimal denominations of the crossfooter is analyzed by the analyzing mechanism, a full stroke will be imparted to the star type bar and a star will be printed.

When the rotation of the cam disk assembly is arrested at the end of the total taking operation by the engagement of the shoulder 350 on the lever 344 with the pin 128, the pin 356 is engaged with the end of the contact face 576 of the lever 562 remote from the axis of the lever.

*Printing positive totals*

Assuming that the positive total 004378 96 appears in the value or indicating wheels of the crossfooter, upon analyzing the value wheels showing the two "0's" of this total, the "0" selector lever is blocked out, in each case, by a projection on the control bar 492 which is then in its right hand position, see Figs. 16 and 17. The control bar and code bars however, allow the star selector lever to be depressed into operating position. The connecting member 546, during the analysis of the first two denominations of the crossfooter is located in the forward position shown in Figs. 36 and 38 so that a partial stroke only is imparted to the star type bar, in each instance, and no stars are printed. The indicating wheels showing the remaining digits of the total are analyzed by the feeler mechanism, the type bar mechanisms corresponding to these digits are selected and the digits are printed in the manner fully set forth in the preceding description. Therefore, the total, when printed, will read 4378 96.

Assuming that the crossfooter contains a positive total of 037082 91 showing on the indicating wheels, upon analyzing the value wheel showing a "0" at the left of the first significant figure of the total, the star selector lever is depressed into operating position. The connecting member 546, during the analysis of this denomination, is located in its forward position shown in Figs. 36 and 38 and a partial stroke only is imparted to the star type bar. Therefore, no star is printed for the reasons stated above. Upon the analysis of the number wheel showing a "3" digit following the "0," the control bar 492 is moved to its left hand position shown in Fig. 20 by the engagement of the projection 510 on one of the bars 22, connected with a code bar, with the contact plate 512 on the control bar. The value wheels showing the digits "3" and "7" of the total are analyzed and the digits are printed in the regular manner described above. Upon analyzing the value wheel showing a "0" following the "7," a significant figure, the star selector lever is blocked out by an elevated portion on the control bar 492. The control bar and the several code bars, however, are then located in positions to release the selector lever corresponding to the "0" type bar mechanism as shown in Fig. 20 and a "0" will therefore be printed. The value wheels showing respectively the remaining digits of the total are analyzed, the corresponding type bar mechanisms are selected and the digits are printed by said mechanisms in the regular manner above described. Thus, the total will be printed 37082 91.

Assuming that the positive total 907438 21 is showing upon the value or indicator wheels of the totalizer mechanism of the crossfooter, upon analyzing the value wheel showing the first digit "9" of the total, the forward code bar 28 is shifted to the left from its normal position. The code bars and control bar 492 are then located in positions to block the star and "0" selector levers from depression into operating position and to allow the "9" selector lever to be depressed. A "9" type bar mechanism will therefore be selected and a "9" will be printed. By the movement of the forward bar 22 to the left, upon the analysis of the indicating wheel of the totalizer showing the "9," the lever 514 is moved longitudinally to the left by the engagement of the forward bar 22 with the rearwardly bent portion 522 on said lever which is then located in its upper position between said bar and the contact plate 512 as shown in Figure 17. During this longitudinal movement of said lever, the control bar 492 is moved to its left hand position shown in Fig. 20 by the engagement of the portion 522 of lever 514 with the contact plate 512. When the value wheel showing the "0" is analyzed, the code bars and the control bar 492 are in positions to allow the "0" selector lever to be depressed and to select the "0" type bar mechanism as shown in Fig. 20 and a "0" will therefore be printed.

The number wheels showing respectively the remaining digits of the total will be analyzed by the feeler mechanism and the digits will be printed by the type bar mechanism under control of the feeler mechanism in the regular manner. The total, as printed, will read as above 907438 21.

*Printing true negative totals*

Figure 16 shows the control bar 492, the code bars and the selector levers in the relative positions assumed by the same for the taking of complements. The code bars, in this figure, occupy the positions assumed by the same before the action of the feeler mechanism in analyzing a total. Fig. 10 also indicates these relative positions of the bar 492, the code bars and the selector levers.

Assume that the negative quantity 993728 32 is showing upon the indicator wheels of the totalizer of the crossfooter. This negative quantity may be termed, for convenience, a complementary total since it consists of the complement of the true negative or algebraic total. The control bar 492 is located in its right hand position and upon analyzing the value wheels showing each of the first two "9's" of the total, the "0" selector lever which normally would be depressed into operative position, is blocked against depression by a projection on the control bar 492. The control bar and the several code bars are located so as to allow the star selector lever to be depressed into operative position as shown in Fig. 16. The connecting member 546, during the analysis of the first two denominations of the total, is located in its forward position as shown in Figs. 36 and 38 and a partial stroke only will be imparted to the star type bar 19a upon the analysis of each of these numbers. No stars will therefore be printed. This will be clear from a consideration of Fig. 10. In analyzing a "9," the forward bar 28 is shifted to the left from the position shown in this figure. Upon analyzing the value wheel showing the digit "3" of the total, the control bar and the code bars will be located to allow the "6" selector lever to be depressed into operative position and a "6" will be printed. Then upon analyzing the number wheel showing the digit "7" in the next lower denomination, the control bar and the code bars will be located to allow the "2" selector lever to be depressed into operative position and a "2" will be printed by the corresponding type bar mechanism. The remaining number wheels showing the digits of the complementary total appearing in the crossfooter will be analyzed and the digits constituting the complements of the first digits respectively will be printed in the same manner. The true negative total printed upon the work sheet will be 6271 68.

Assuming that the complementary total 947965 28 is showing on the indicator wheels of the crossfooter. In analyzing the indicating or value wheel showing the first "9" which lies to the left of the first significant figure, the code bars and bar 492 are positioned to allow the star selector lever to be depressed into operative position. At this time in the cycle, however, the connecting member 546 is located in its forward position and a partial stroke only is imparted to the star type bar and no star is printed. The value wheels showing the next two digits of the complementary total are analyzed, the type bar mechanisms for the digits respectively constituting the complements of said first digits are selected by the selector mechanism and the complements are printed upon the work sheet in the regular way. Upon analyzing the value wheel showing the digit "4" the control bar 492 is moved to its left hand position shown in Fig. 21 by the engagement of the extension on the corresponding code bar 22 with the contact plate 512 on the control bar. Therefore, upon analyzing the value wheel showing the next "9" digit of the complementary total, which follows a significant figure, the star selector lever is blocked out of operative position by a projection of the control bar 492. The said control bar and the several code bars, however, are then positioned so that the "0" selector lever is depressed into operating position and a "0" is printed. This will be clear from Fig. 21, assuming that the forward bar 23 is shifted to the left from the position shown in this figure, upon the analysis of the "9" in the complementary total. The value wheels showing respectively the remaining digits of the complementary total are analyzed, the type bar mechanisms are selected and the digits are printed in the regular way. The total when printed will read 52034 72.

Assume that the complementary total 985092 53 appears on the indicating wheels of the totalizer of the crossfooter. In analyzing the value wheel showing the first "9" of the total which occurs before a significant figure, a star type lever is selected and a partial stroke is imparted to the said bar, the connecting member 546 being then located in its forward position. The value wheel showing the next two digits of the complementary total are analyzed, the type bar mechanisms corresponding respectively to the complements of these digits are selected and the complements are printed in the regular way. When the value wheel showing the digit "8" is analyzed, the control bar 492 is moved to its left hand position shown in Fig. 21 by the engagement of an extension on one of the bars 22 with the contact plate 512. Then when the value wheel showing the zero in the complementary total is analyzed, the bar 492 and the code bars are positioned to select the "9" type bar mechanism as shown in Fig. 21 and a "9" is printed upon the work sheet.

The value wheels showing the remaining digits of the complementary total appearing in the crossfooter are analyzed, the type bar mechanism corresponding to the complements of said digits are analyzed and the complements are printed in the regular way. The total printed will read 14907 47.

Figs. 39, 40, 41 and 42 show a modified construction adapted to be embodied in the machine to produce a machine in which the star printing mechanism is rendered inoperative in analyzing denominations to the left of the decimal point position and also in analyzing denominations to the right of the decimal point position. With the construction shown in these figures embodied in the machine, however, in analyzing denominations to the right of the decimal point position, when a number wheel showing a "0" is analyzed, a "0" is printed. In the construction illustrated in Figs. 39 to 44 inclusive, bar 492*a* is substituted for the bar 492 shown in the earlier figuring of this application and a control mechanism for the bar 492*a* differing from that for the bar 492, is employed. All the other parts of the machine in which the bar 492*a* is embodied are the same as shown in Figs. 1 to 38, inclusive.

The bar 492*a* is mounted for longitudinal movement and is yieldingly urged in a left hand direction by a suitable spring. The bar is formed at its right hand end with a slot 580 in which engages the end of the upwardly extending arm of the bell crank 16*a* pivoted at 18*a* on the frame of the machine. This bar is mounted to slide laterally of the type head of the machine in slots in the studs 110 fixed in the frame of said head and is acted upon by a coil spring 104*a* which constantly tends to move the same in a left hand direction. The movement of the bar toward the left under the influence of the spring normally is limited by means of an upwardly projecting lug 582 formed on the bar and arranged to engage a forwardly extending projection 584 on a lever 586 pivoted at 588 on the frame of the head. The lever 586 is acted upon by a coil spring 587 which constantly tends to swing the same in a counterclockwise direction and thus to maintain the projection 584 in position to be engaged by the lug 582 to limit the leftward movement of the bar. The bar 492*a* has elevations and depressions substantially the same as those of the bar 492 and arranged to be engaged by the forwardly extending arms of the selector levers 106 respectively for the type bar mechanisms for the numeral "0" and for the star signal. The control bar 492*a* is normally held in its right hand position by the lever 586 as shown in Figs. 39 and 40. When the control bar is in this position, and the selector levers are in normal or positive total positions, the elevations and depressions on the bar will be located to allow the selector lever for the star printing mechanism to be depressed into operating position and to prevent the "0" selector lever from being depressed into operating position. The control bar is maintained in this right hand position by the engagement of the lug 582 with the projection 584 until the analyzing mechanism for analyzing the number wheels of the totalizer of the crossfooter analyzes a significant figure in the total or until said analyzing mechanism reaches the decimal point position. When either of these events occur, the control bar 492*a* is released by the projection 584 and allowed to move to the left under the influence of the spring 104*a*, its left hand movement then being limited by the engagement of the upwardly extending lug 592 on the bar with a fixed pin 594 mounted on the frame of the type head of the machine. When the control bar is in its left hand position determined by the engagement of the lug 592 with the pin 594, and the selector levers are in normal positions, the elevations and depressions on the bar are located respectively in positions to prevent the star selector lever from being depressed into operating position, and to allow the "0" selector lever to be depressed into operating position. Therefore, with the bar 492 in this position, upon the analysis of a "0" in the number wheels of the crossfooter, the "0" selector lever will be depressed into operating position and a "0" will be printed by the zero type bar mechanism.

In the operation of taking a total containing one or more significant figures to the left of the decimal point position, the control bar 492*a* is maintained in its right hand position until the first significant figure in the crossfooter is analyzed by the analyzing mechanism. In order to release the control bar when this occurs and allow the same to move to its left hand position, under the influence of the spring 104*a*, the lever 586 is formed with a forwardly extending contact portion 596, which is arranged to be engaged by the extension 510 formed on each of the bars 22 to the rear of the forward bar 22. When one of these bars 22, back or the forward bar, is moved to the left upon the analysis of the significant figure in the crossfooter, the extension 510 on the same engages the forwardly extending portion 596 of the lever 586 and swings said lever in a clockwise direction, Figs. 39 to 44, inclusive, thereby lifting the projection 584 above the lug 582 on the control bar to release said bar. The spring 104*a* then moves the bar to its left hand position.

In analyzing a number in which no significant figure occurs to the left of the decimal point position, the bar 492*a* is maintained in its right hand position until the decimal point position is reached by the analyzing mechanism. When the analyzing mechanism is passing through the decimal point position, the lever 586 is actuated to release the control bar. The mechanism for actuating the lever 586 to release the control bar at this point in the operation of the machine comprises an angular bar 598 slidably mounted adjacent one end upon a screw stud 600 fixed in the frame of the head and engaging in a slot 602 in said bar. The adjacent end portion of the bar is bent rearwardly and extends to the left of the upwardly extending arm of the lever 586 as clearly shown in Fig. 39. The other end portion of the bar is supported on a screw stud 604 also fixed in the frame of the head and engaging in a slot 606 having the form clearly shown in Figs. 39 to 42, inclusive. The bar 598 is acted upon by a coil spring 608 which normally maintains the same in its limiting left hand position determined by the engagement of the stud 604 with the right hand end wall of the slot 606 as shown in Figs. 39 and 40, the spring also tending to depress the right hand end portion of the bar. With the bar in this position, the lever 586 occupies the position shown in Figs. 39 and 40 with the projection 584 thereon located to the left of the lug 582 on the control bar.

When the analyzing mechanism is passing through the decimal point position of the crossfooter in taking a total, the bar 598 is moved to the right from the position shown in Figs. 39 and 40. The bar is moved to the right at this time by means of a square stud 610 mounted on the actuator 30 and arranged to engage the shoulder 612 on said bar as the analyzing mechanism, in its step by step movement toward the right, is moving from the denomination to the left of the decimal point position to the latter position.

With the above mechanism, assuming that the parts are in the condition shown in Fig. 39, in the taking of the total, if the number contains no significant figure to the left of the decimal point position, the control bar 492*a* is held in its right hand position by the lever 586 until the decimal point position is reached by the analyzing mechanism. When the analyzing mechanism advances from the denomination above the decimal point position through the latter position, the stud 610 engages the shoulder 612 on the bar 598 as shown in Fig. 40 and, as the analyzing mechanism advances through the decimal point position, the lever 586 is swung in a clockwise direction to release the control bar 492*a* and allow the same to move to its left hand position. The control bar remains in this position during the analysis of the two decimal denominations of the crossfooter. As the analyzing mechanism is moved toward the right by the actuator 30 and the bar 598 is carried to the right therewith, the right hand end portion of the bar is lifted through the engagement of the stud 604 with the inclined edge 614 of the slot 606. After the lever 586 is actuated to release the bar 492*a*, the continued upward movement of the right hand end portion of the bar 598 carries the shoulder 612 above the stud 610 on the actuator 30. The bar 598 is then moved back to the left by the spring 608, the right hand end portion of the bar resting on the stud as shown in Fig. 42. The leftward movement of the bar 598 is limited by the engagement of the right edge of the slot 606 with the stud 604. The lever 586 however remains in the position shown in Figs. 41 and 42 until the completion of the total taking operation, the projection 584 resting on the top of the lug 582 as shown in these figures.

The control bar 492*a* is thus located in its left hand position during the passage of the analyzing mechanism through the two decimal denominations of the crossfooter. Therefore, upon analyzing a zero in the total to the right of the decimal point position, a zero will be printed.

The lever 514 cooperates with the contact plate 596 on the lever 586 in substantially the same way that said lever 514 cooperates with the contact plate 510 in the construction shown in Figs. 1 to 38, inclusive. With the totalizer of the crossfooter in positive condition, when the forward bar 22 is moved to the left upon the analysis of a wheel showing a "9" to the left of the decimal point position by the analyzing mechanism, the left hand end of the bar engages the rearwardly bent portion 522 of the lever 514 which is then in elevated position, and moves the lever to the left. This portion 522 of the lever is arranged to engage the contact plate 596 on the lever 586 (see Fig. 43). Thus, as the lever 514 is moved to the left, the lever 586 is actuated to release the control bar 492*a* and allow the same to be moved to its left hand position. Thereafter, when a wheel of the crossfooter showing a "0" is analyzed, a "0" is printed.

When the total key is depressed, with the totalizer of the crossfooter in credit balance condition, the portion 522 of the lever 514 is carried below the left hand end of the forward bar 22 as shown in Fig. 44, so that the control bar 492*a* is not released by the lever 586 when a wheel showing a "9" to the left of the first significant figure and to the left of the decimal point position is analyzed by the analyzing mechanism. When a zero is analyzed by the analyzing mechanism and a "9" is printed, the bell crank lever 524 is actuated to move the lever 514 to the left and the lever 586 is actuated by the engagement of the portion 522 of lever 514 with contact plate 596 to release the control bar 492a, allowing the bar to move into its left hand position. Thereafter, when a "9" is analyzed by the analyzing mechanism, a "0" will be printed.

*Printing other positive and negative totals upon machine constructed as shown in Figs. 1 to 38 inclusive*

Assume that the positive total 000000 05 stands on the indicating wheels of the totalizer of the crossfooter. In analyzing the wheels showing the "0's" in the several places to the left of the decimal point position, the star selector lever is depressed into operating position upon analyzing each denomination. While the analyzing mechanism is passing through these several denominations, however, the connecting member 546 is located in its forward position and a partial stroke only is imparted to the star type bar. No stars therefore are printed. Upon analyzing the wheel showing the "0" to the right of the decimal point position, the star selector lever is again depressed into operating position. At this time, however, the connecting member 546 is located in its rearward position so that a full stroke is imparted to the star type bar and a star is printed. The indicating wheel showing the "5" digit of the total is analyzed, the corresponding type bar mechanism is selected and a digit is printed in the regular manner. Thus the total will be printed *5 in the decimal columns of the work sheet.

Assume that the totalizer is cleared by a subtraction from a positive total, the value or indicating wheels of the crossfooter showing the number 000000 00. In taking this total, upon analyzing the wheels of the several denominations to the left of the decimal point position and selecting the type bar mechanisms, the machine will operate substantially as in the previous example and no digits will be printed. In analyzing the wheels of each of the denominations to the right of the decimal point position, the star selector lever, in each case, will be allowed to be depressed into operating position. At the time that each of these denominations is analyzed, the connecting member 546 will be located in its rearward position and full stroke will be imparted to the star type bar to print a star. The total will therefore be printed ** in the decimal columns of the work sheet.

Assume that the negative balance or negative total 999990 99 is showing in the indicating wheels of the crossfooter. In analyzing the wheels respectively showing showing each of the "9's" to the left of the decimal point position, the control bar 492 and the several code bars are located to allow the star selector lever to be depressed into operating position. During the analysis of each of these denominations, however, the connecting mehmber 546 is located in its forward position so that no stars are printed. In analyzing the "0" in the denomination immediately to the left of the decimal point position, the code bars and the bar 492 are located to allow the "9" selector lever to be depressed into operating position, the "9" key lever is actuated and a "9" is printed. During actuation of the "9" key lever to render operative the "9" type bar mechanism, the bell crank lever 514 is actuated by the key lever and the control bar 492 is shifted to the left by said bell crank. Upon analyzing the "9's" to the right of the decimal point position, the code bars and the bars 492 are located in positions to allow the "0" selector lever to be depressed into operating position and "0" will be printed. The total, as printed, therefore, will read 9 00.

*Printing totals upon machine provided with mechanism shown in Figs. 39 to 44 inclusive*

In printing, upon a machine provided with the mechanism shown in Figs. 39 to 44, inclusive, the positive totals 004378 96, 037082 91 and 907438 21 and the negative totals 993728 32, 947965 28 and 985092 53, set up respectively on the indicating wheels of the totalizer, the indicating wheels will be analyzed, the type bar mechanisms will be selected and the totals will be printed in substantially the same manner as with the machine constructed as shown in Figs. 1 to 38, inclusive.

In printing the positive total 000000 05 upon the machine, upon analyzing the several denominations to the left of the decimal point position, no digits will be printed. Upon analyzing the wheel showing the "0" in the first denomination to the right of the decimal point position, the selector lever of the start printing mechanism is blocked from depression by means of a projection on the control bar 492a which has been moved into its left hand position. The elevations and depressions on the code bars and the control bar are then located to allow the "0" selector lever to be depressed into operating position. Therefore, a "0" will be printed in the total although the connecting member of the star printing mechanism is then located in its rearward position. The indicating wheel showing the digit "5" in the second denomination to the right of the decimal point position is analyzed, the "5" type bar mechanism is selected and "5" is printed in the regular way. The total when printed will read 05 in the decimal columns of the work sheet.

In printing the complementary or negative totals 993728 32, 947965 28 and 985029, upon the machine, the indicating wheels of the totalizer will be analyzed, the type bars will be selected and the totals will be printed in substantially the same manner as with the machine constructed as shown in Figs. 1 to 38, inclusive. This is also true in taking the negative total 999990 99, which in both cases is printed 9 00.

When the number wheels of the crossfooter are cleared following the setting up of a negative total in the totalizer, the number showing on the indicating wheels of the crossfooter will be 999999 99. In the taking of this total with a machine provided with the mechanism shown in Figs. 39 to 44, inclusive, upon analyzing the wheels showing the several "9's" to the left of the decimal point position, the code bars and the bar 492a are located to allow the star selector lever to be depressed into operating position. During the analysis of these denominations, however, the connecting member 546 is located in its forward position so that a partial stroke only is imparted to the star type bar in each actuation thereof and no stars are printed. In analyzing the two "9's" to the right of the decimal point position, the bar 492a is located in its left hand position to allow the "0" selector lever to be depressed into operating position. Therefore, "0's" are printed in each instance. Thus the total will be printed 00 in the decimal columns of the work sheet. If the machine is provided with oblique type on shiftable type heads as in the Sundstrand application, Serial No. 552,656, the oblique "0" type may be shifted into operating position in printing this total.

The machine is shown as provided with a bar 616 which extends across the crossfooter frame in front of the path of movement of the feeler carriage and is supported at its ends upon the screw studs 26c. Upon this bar is formed an upwardly extending projection 618 located opposite the decimal point position of the crossfooter. This projection is located just below the path traveled by the square stud 619 on the feeler carriage as the analyzing mechanism passes from the first denomination above the decimal point position to the first denomination below said position. If, for any reason, the decimal space mechanism fails to act properly to cause the master wheel carriage of the crossfooter to escape two letter spaces as the feeler carriage passes from the denomination immediately above the decimal point position so that the mechanism for depressing the feelers acts when said feelers are in the decimal point position, the stud 619 will engage the projection 618 and prevent the feelers from being depressed. The depression of the feelers at this time would result in a misoperation and might lock up or cause damage to the machine.

It is to be understood that the construction shown and described in this application is merely illustrative of the invention and that the several features thereof are not limited to the particular construction and arrangement of parts of the illustrated embodiment but that the invention may be embodied in other forms within the scope of the claims.

Having explained the nature and object of the invention and having specifically described a machine embodying the various features of the invention, in their preferred forms, what is claimed is:

1. A combined typewriting and computing machine having a power means, a platen, type bar mechanisms including a plurality of numerical type bars and at least one non-numerical type bar for printing on said platen, character by character, a totalizer including a plurality of digital representing members, engaging members to connect individually said type bar mechanisms with said power means for actuation of said type bars, analyzing means to analyze, digit by digit, the amount represented by the digital representing wheels of said totalizer, selecting means controlled thereby to select and operate an engaging member corresponding to the analyzed digit of the amount and including means normally operative to cause selection and operation of the engaging member for said non-numerical type bar mechanism upon the analysis of a digital member representing a non-significant digit of said amount, and means operative during said analysis to disable said non-numerical type bar from printing when its engaging member is connected to said power means by said selecting means.

2. A combined typewriting and computing machine as set forth in claim 1 including means to enable said non-numerical type bar for printing when its engaging member is connected to said power means and printing control means for said enabling means, said control means operating during the analysis by said analyzing means of predetermined ones of said digital representing wheels to enable said non-numerical type bar for printing when actuated.

3. A combined typewriting and computing mechanism as set forth in claim 2 including an operating member connected to said analyzing means and a linkage actuated by said operating member prior to analysis of the first of said predetermined ones of said digital representing members but after analysis of the other of said digital representing members to cause said normally operative means of said selecting means to thereafter cause selection and operation of the engaging member for a numerical type bar mechanism for each succeeding non-significant digit of said total.

4. A combined typewriting and computing machine comprising a power means, a plurality of type bar mechanisms, each including a type bar and a power driven linkage therefor, a platen to support a work sheet for receiving printing impressions from said type bars, an engaging member for each type bar mechanism to engage said power driven linkage with said power means to actuate its type bar, a totalizer including a plurality of digit wheels, analyzing means shiftable into engagement with successive ones of said digit wheels and settable in accordance with the differential position of the analyzed digit wheel, a selecting means controlled by said analyzing means to select and operate the engaging member for a type bar corresponding to the differential position of said analyzed digit wheel, said selecting means including a member normally set to determine selection and operation of the engaging member for a non-numerical type bar mechanism upon the analysis by said analyzing means of a digit wheel which represents a non-significant digit in the amount indicated by said digit wheels, parts forming a lost motion connection in the power driven linkage of said non-numerical type bar mechanism and means to hold the parts of said lost motion connection in position to prevent an effective printing movement of said non-numerical type bar upon actuation of its power driven linkage by said power means.

5. A combined typewriting and computing machine as set forth in claim 4 including members operable to relatively shift the parts of said lost motion connection to a position wherein there is no lost motion, thereby enabling a printing movement of said non-numerical type bar by said power driven linkage when actuated by power means, and a control member to operate said members to eliminate said lost motion during analysis of predetermined ones of said digit wheels by said analyzing means.

6. A combined typewriting and computing machine as set forth in claim 5 including a part shiftable with said analyzing means and a shift member operable thereby prior to analysis of said predetermined ones of said digit wheels to set said member of said selecting means to another position wherein it determines selection and operation of the engaging member for a numerical character type bar mechanism upon analysis of a non-significant digital representing position of said predetermined digit wheels.

7. A combined typewriting and computing machine including power means, a platen, a plurality of type bar mechanisms, each including a type bar and a power driven linkage therefor, an ecapement mechanism operable to relatively shift said platen and said plurality of type bar mechanisms, each power driven linkage engageable with said escapement mechanism to actuate said mechanism upon operation of said linkage, an engaging member for each type bar mechanism to connect said power driven linkage with said power means, a totalizer including a plurality of digital representing wheels in a denominational series to the right and left of a decimal point position, an analyzing means shiftable from the highest denomination to the lowest denomination of said wheels and settable in each denominational position in accordance with the digit represented by the analyzed digital representing wheel, selection members controlled by said analyzing means to select and operate the engaging member for the numerical type bar mechanism corresponding to the digit represented by the analyzed digit wheel and to additionally select and operate a symbol type bar mechanism upon analysis of a digital wheel representing "0," a selection member blocking slide normally set to disable the selecting member for the "0" type bar mechanism, said power driven linkage for said symbol type bar mechanism including two relatively shiftable parts having in one relative position a limited free movement relative to each other, and means urging said parts into said limited free movement position whereby said power driven linkage will, when operated, actuate said escapement only, the driven one of said parts actuating its type bar for a partial, non-printing stroke.

8. A combined typewriting and computing machine as set forth in claim 7 including means for relatively shifting said parts of said power driven linkage of said symbol type bar mechanism to a second position wherein said limited free movement is eliminated and said type bar will be driven to print when said power driven linkage is actuated, means to operate said analyzing means and said selector members, and a member driven with said operating means to actuate said relatively shifting means during analysis of said digital representing wheels to the right of the decimal point.

9. A combined typewriting and computing machine as set forth in claim 8 including mechanism operative upon analysis of a digital representing wheel which represents a digit other than "0" to shift said selection member blocking slide to another position wherein upon analysis of a wheel representing "0," the "0" type bar mechanism engaging member will be selected and operated and the selection member for said symbol type bar mechanism will be disabled, a projection on said analyzing mechanism, and a means actuated by said projection as the analyzing means passes through the decimal point position to shift said blocking slide to said other position.

10. In a combined typewriting and computing machine having a power means, a platen, typing mechanisms to print, character by character, on a work sheet on said platen, each typing mechanism including a type bar, a power driven linkage to actuate said type bar and an engaging member operable to engage said linkage with said power means to actuate said type bar, a totalizer including digit representing wheels arranged in denominations, analyzing means to sense said wheels seriatim, selector mechanism controlled by said analyzing means to select and operate said engaging members in accordance with the digit representing positions of the sensed digit wheels, said selector mechanism being normally set to select and operate for one digit representing position of a sensed wheel, the engaging member for a non-digital typing mechanism and conditionable by said analyzing means when any other digit representing position of a wheel is sensed, to thereafter select and operate the engaging member for the corresponding digit typing mechanism, the combination of an adjustable member in said power driven linkage for said non-digital typing mechanism, said adjustable member in one position transmitting a partial non-printing actuation to its associated type bar and in another position transmitting a full printing movement, means holding said member in said one position and means operative during analysis of predetermined ones of said digit representing wheels to move said adjustable member to said other position.

11. In a combined typewriting and computing machine having a power means, a platen, typing mechanisms to print, character by character, on a work sheet on said platen, each typing mechanism including a type bar, a power driven linkage to actuate said type bar and an engaging member operable to engage said linkage with said power means to actuate said type bar, a totalizer including digit representing wheels arranged in denominations, analyzing means to sense said wheels seriatim, selector mechanism controlled by said analyzing means to select and operate said engaging member in accordance with the digit representing positions of the sensed digit wheels, said selector mechanism being normally set to select and operate for one digit representing position of a sensed wheel, the engaging member for a non-digital typing mechanism and conditionable by said analyzing means when any other digital representing position of a wheel is sensed, to thereafter select and operate the engaging member for the corresponding digit typing mechanism, the combination of an adjustable member in said power driven linkage for said non-digital typing mechanism, said adjustable member in one position transmitting a partial non-printing actuation to its associated type bar and in another position transmitting a full printing movement, means holding said member in one position, means operative during analysis of predetermined ones of said digit representing wheels to move said member to said other position, a slide operable to condition said selector mechanism for selection and operation of the engaging member corresponding to said one digit when said one digit representing position of a digit wheel is sensed, and slide operating means connected to said analyzing means to shift said slide prior to analysis of said predetermined ones of said digit representing wheels.

12. In a combined typewriting and computing machine the combination of typing mechanisms for typing numeral characters and at least one non-numerical character, a totalizer including sensible digit wheels, analyzing mechanism to sense said wheels seriatim, selector mechanism controlled by said analyzing mechanism to select for actuation the one of said numeral typing mechanisms corresponding to the differential position of the sensed digit wheel and for one of said differential positions to additionally select said non-numerical typing mechanism, means to operate said selector mechanism to cause actuation of a selected typing mechanism, a member settable in one position to prevent selection by said selector mechanism of the typing mechanism corresponding to said one digital position and in another position to prevent selection of the typing mechanism for said non-numerical character and normally set to prevent selection of said one digit typing mechanism, shiftable means to normally disable said non-numerical typing mechanism from printing when operated and a linkage operated by said selector mechanism operating means during analysis of predetermined ones of said digit wheels for shifting said shiftable means to enable said non-numerical typing mechanism for printing when operated.

13. In a combined typewriting and computing machine the combination of typing mechanisms for typing numeral characters and at least one non-numerical character, a totalizer including sensible digit wheels, analyzing mechanism to to sense said wheels seriatim, selector mechanism controlled by said analyzing mechanism to select for actuation the one of said numeral typing mechanisms corresponding to the differential position of the sensed digit wheel and for one of said differential positions to additionally select said non-numerical typing mechanism, means to operate said selector mechanism to cause actuation of a selected typing mechanism, a member settable in one position to prevent selection by said selector mechanism of the typing mechanism corresponding to said one digital position and in another position to prevent selection of the typing mechanism for said non-numerical character and normally set to prevent selection of said one digit typing mechanism, shiftable means to normally disable said non-numerical typing mechanism from printing when operated, a linkage operated by said selector mechanism operating means during analysis of predetermined ones of said digit wheels for shifting said shiftable means to enable said non-numerical typing mechanism for printing when operated, means to shift said settable member to a position wherein it prevents selection of said non-numerical typing mechanism and a member connected to said analyzing mechanism to operate said shifting means immediately prior to sensing of said predetermined ones of said digit wheels by said analyzing mechanism.

14. A typewriting and computing machine comprising power means, a platen, a plurality of typing instrumentalities for typing, character by character, on a work sheet supported on said platen, each typing instrumentality including a type member, a power driven linkage and an engaging member to connect said linkage to said power means for actuation of said type member, an escapement mechanism to relatively shift said platen and said typing instrumentalities, said escapement mechanism being operated by each power driven linkage upon actuation thereof, a totalizer, a plurality of digit wheels representing numbers in said totalizer in a denominational series, two of said wheels being spaced apart to provide a decimal space, analyzing and selecting means shiftable relative to said wheels to sense said digit wheels seriatim and to operate the engaging member for the typing instrumentality which prints a numeral corresponding to that represented by the sensed digit wheel, said analyzing and selecting mechanism including a switch member normally set to cause a power driven actuation of a non-numerical character typing instrumentality when a digit wheel representing a non-significant figure is sensed, said power driven linkage for said non-numerical character typing instrumentality including two relatively shiftable members which have in one position a limited free movement such that the type bar driven thereby will not be actuated a distance sufficient for a printing operation but which linkage is effective to operate said escapement mechanism when actuated, means urging said relatively shiftable members into said position, and means effective during analysis of said digit wheels to the right of said decimal space position to relatively shift said parts to another position in which an actuation of said power driven linkage will drive said type bar to print.

15. A typewriting and computing machine comprising power means, a platen, a plurality of typing instrumentalities for typing, character by character, on a work sheet supported on said platen, each typing instrumentality including a type member, a power driven linkage and an engaging member to connect said linkage to said power means for actuation of said type member, an escapement mechanism to relatively shift said platen and said typing instrumentalities, said escapement mechanism being operated by each power driven linkage upon actuation thereof, a totalizer, a plurality of digit wheels representing numbers in said totalizer in a denominational series, two of said wheels being spaced apart to provide a decimal space, analyzing and selecting means shiftable relatively to said wheels to sense said digit wheels seriatim and to operate the engaging member for the typing instrumentality which prints a numeral corresponding to that represented by the sensed digit wheel, said analyzing and selecting mechanism including a switch member normally set to the cause a power driven actuation of a non-numerical character typing instrumentality when a digit wheel representing a non-significant figure is sensed, said power driven linkage for said non-numerical character typing instrumentality including two relatively shiftable members which have in one position a limited free movement such that the type bar driven thereby will not be actuated a distance sufficient for a printing operation but which linkage is effective to operate said escapement mechanism when actuated, means urging said relatively shiftable members into said position, means effective during analysis of said digit wheels to the right of said decimal space position to relatively shift said parts to another position in which an actuation of said power driven linkage will drive said type bar to print, means to move said switch member to a second position wherein said analyzing and selecting means will operate the engaging member for the "0" typing instrumentality rather than that for said non-numerical typing instrumentality when a wheel representing a non-significant figure is sensed and a projection on said analyzing and selecting means to operate said moving means as said analyzing and selecting means passes through said decimal space position whereby "0's" may be printed for each non-significant figure to the right of the decimal point in the amount represented by said digit wheels.

OSCAR W. SWANSON.

References Cited in the file of this patent

UNITED STATES PATENTS

| Number | Name | Date |
|---|---|---|
| 2,258,714 | Pitman | Oct. 14, 1941 |
| 2,364,758 | Roggenstein | Dec. 12, 1944 |
| 2,398,395 | Pitman | Apr. 16, 1946 |